United States Patent
Yamazaki

(10) Patent No.: US 7,083,033 B2
(45) Date of Patent: Aug. 1, 2006

(54) TORQUE TRANSMISSION APPARATUS

(75) Inventor: Nobushi Yamazaki, Tochigi-ken (JP)

(73) Assignee: Tochigi Fuji Sangyo Kabushiki Kaisha, Tochigi-Ken (JP)

( * ) Notice: Subject to any disclaimer, the term of this patent is extended or adjusted under 35 U.S.C. 154(b) by 0 days.

(21) Appl. No.: 10/807,725

(22) Filed: Mar. 24, 2004

(65) Prior Publication Data

US 2004/0188216 A1  Sep. 30, 2004

(30) Foreign Application Priority Data

Mar. 27, 2003 (JP) .......................... P.2003-087047

(51) Int. Cl.
 *F16D 28/00* (2006.01)
(52) U.S. Cl. .................. 192/84.6; 192/84.7; 192/93 A
(58) Field of Classification Search ............. 192/70.23, 192/84.6, 84.7, 93 A
See application file for complete search history.

(56) References Cited

U.S. PATENT DOCUMENTS

| | | | |
|---|---|---|---|
| 2,827,994 A | 3/1958 | Tiedeman et al. | |
| 4,976,347 A * | 12/1990 | Sakakibara et al. | 192/20 |
| 5,080,640 A * | 1/1992 | Botterill | 475/231 |
| 5,279,401 A * | 1/1994 | Stall | 192/52.4 |
| 5,372,106 A | 12/1994 | Botterill | 123/198 R |
| 5,423,235 A * | 6/1995 | Botterill et al. | 74/665 GA |
| 6,398,686 B1 * | 6/2002 | Irwin | 475/150 |
| 6,561,939 B1 * | 5/2003 | Knapke | 475/150 |
| 2002/0134635 A1 * | 9/2002 | Teraoka et al. | 192/35 |
| 2003/0024787 A1 * | 2/2003 | Osborn et al. | 192/48.2 |

FOREIGN PATENT DOCUMENTS

| | | |
|---|---|---|
| DE | 90 07 320 U1 | 7/1991 |
| DE | 39 15 959 C2 | 1/1992 |
| DE | 39 20 861 C2 | 1/1992 |
| DE | 100 65 356 C1 | 9/2002 |
| JP | 6-264978 | 9/1994 |

OTHER PUBLICATIONS

German Office Action for German Application No. 10 2004 015 241.3-12 mailed on Oct. 10, 2005, 3 pages.
English Translation of Office Action in German Patent Application No. 10 2004 015 271.3-12, mailed Oct. 10, 2005, 2 pages.

* cited by examiner

Primary Examiner—Richard M. Lorence
(74) Attorney, Agent, or Firm—Osha Liang L.L.P.

(57) ABSTRACT

A torque transmission apparatus includes a clutch housing and a clutch hub, a frictional multi-plate clutch for transmitting torque between the clutch housing and the clutch hub, a pressurizing member for bringing the frictional multi-plate clutch into engagement by producing a thrust, and a motor for generating a relative rotation between members by rotation of member of the pressurizing member. In the torque transmission apparatus, an accommodating recessed portion is provided in an outer wall of the clutch housing, wherein the pressurizing member disposed in the accommodating recessed portion, a penetrating portion which confronts the pressurizing member is provided in the outer wall, and a transmission member interposed between the pressurizing member and a flange portion of the clutch hub for transferring a thrust of the pressurizing member to the clutch hub is disposed in the penetrating portion so as to pass therethrough.

17 Claims, 19 Drawing Sheets

ACTUATOR APPLIED CURRENT

ACTUATOR APPLIED CURRENT

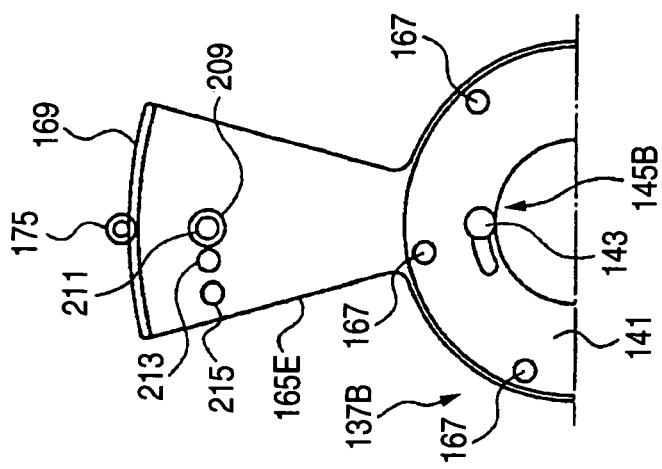
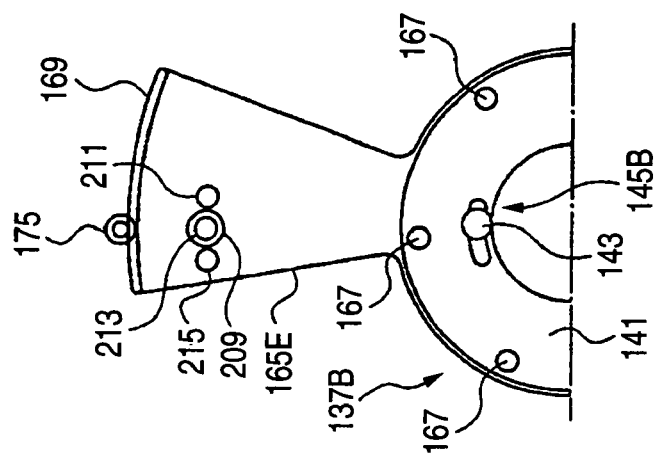
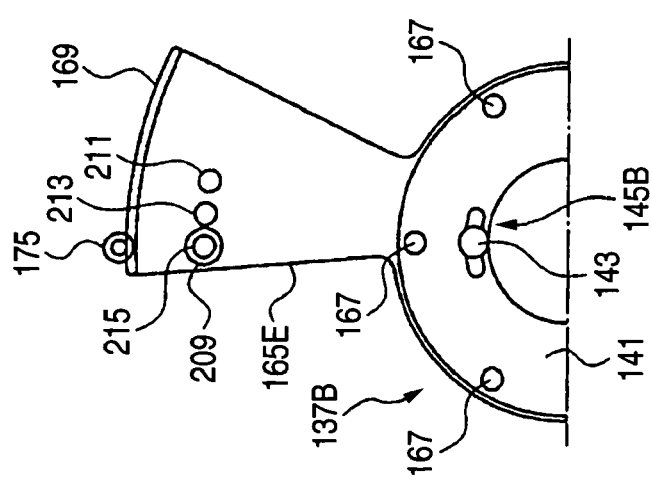

PRIOR ART

TORQUE TRANSMISSION APPARATUS

BACKGROUND OF THE INVENTION

The present invention relates a torque transmission apparatus for an automobile.

There has been a torque transmission apparatus as shown in FIG. 24, for example, as a related torque transmission apparatus. FIG. 24 is a cross-sectional view illustrating a main part of the related torque transmission apparatus.

As shown in FIG. 24, the related torque transmission apparatus 301 is disposed in such a manner that an output shaft 305 can rotate relative to a crankshaft 303. A clutch pressure plate 307 is provided on the output shaft 305 as an integral part thereof, and a clutch housing 311 faces to the clutch pressure plate 307 via a clutch plate 309 in a direction extending along an axis of rotation.

A presser ring 315 is disposed adjacent to the clutch housing via a thrust bearing 313. The presser ring 315 engages with a casing 317 which is on a fixed side in a rotating direction and is designed to move in the direction along the axis of rotation. A support ring 319 faces to the presser ring 315.

A cam mechanism having a ball 321 is provided between the presser ring 315 and the support ring 319. The support ring 319 abuts with a support ring 325 supported on the casing 317 side via a thrust bearing 323.

A gear 329 provided on one end of a shaft 327 meshes with the support ring 319. A gear 331 is provided on the other end of the shaft 327 to mesh with a pinion 335 on a motor 333 side.

Consequently, the support ring 319 rotates via the pinion 335, the gear 331, the shaft 327 and the gear 329 by virtue of the driving of the motor 333. This support ring 319 rotates relative to the presser ring 315 and then, a cam mechanism having a ball 121 works to produce a thrust. This thrust so produced functions as a reaction force to the support ring 325 and moves the presser ring 315 to thereby press the clutch housing 311 in the direction along the axis of rotation.

The clutch housing 311 is moved by the pressing, and the clutch plate 309 is engaged between the pressure plate 307 and the clutch housing 311 so moved. A torque transmission from the crankshaft 303 to the output shaft 305 side via the clutch plate 309 is implemented by the engagement (for example, refer to JP-A-06-264978).

In the aforesaid construction, however, since the pressure plate 307, the clutch plate 309, the clutch housing 311, the presser ring 315, the cam mechanism having the ball 321 and the support ring 319 are disposed in series in the direction along the axis of rotation, it is difficult to make the torque transmission apparatus compact in the direction along the axis of rotation. In addition, as the friction radius of the clutch plate 309 increases, the torque transmission apparatus is forced to increase in size in a direction along a rotating radius. Thus, it has been difficult to make the increase in friction radius compatible with the suppression of increase in overall size of the apparatus.

SUMMARY OF THE INVENTION

An object of the invention is to provide a torque transmission apparatus which can suppress the increase in overall size of the apparatus while attempting to increase the friction radius of a frictional engagement portion.

With a view to attaining the object, according to the invention, there is provided a torque transmission apparatus comprising: a casing; a first rotational member disposed in the casing; a second rotational member disposed relatively rotatable to the first rotational member; a frictional engagement portion provided between the first and second rotational members for transmitting torque according to an engaging force; a pressurizing member, including first and second members relatively rotatable to each other, that produces a thrust through relative rotation between the first and the second members for bringing the frictional engagement portion into friction engagement; and a actuator supported on the casing for rotationally driving at least one of the first and second members to generate the relative rotation.

Further, it is more preferable that, in the torque transmission apparatus, the pressurizing member is disposed on an inner radial side of the frictional engagement portion.

Further, it is more preferable that the torque transmission apparatus further comprises an outer wall formed in the first rotational member in at least one of directions along an axis of rotation and extending towards an inner circumferential side of the first rotational member in a direction along a rotating radius; a connecting wall formed in the second rotational member and extending along the outer wall; an accommodating recessed portion formed in the outer wall to enter an inner circumferential side of the second rotational member, wherein the pressurizing member is disposed in the accommodating recessed portion; a penetrating portion formed in the outer wall and facing to the pressurizing member; and a transmission member disposed in the penetrating portion and interposed between the pressurizing member and the connecting wall of the second rotational member, for transferring a thrust of the pressurizing member to the second rotational member.

Further it is more preferable that, in the torque transmission apparatus, the pressurizing member is disposed on the outer wall side of the connecting wall.

Further it is mote preferable that the torque transmission apparatus further comprises a driving member, connecting at one side to the actuator and at the other side to one of the first and second members of the pressurizing member, arranged to step over the first and second rotational members.

Further, it is more preferable that, in the torque transmission apparatus, the actuator comprises an electric motor and is disposed on an outer radial side of the frictional engagement portion.

Furthermore, it is more preferable that, in the torque transmission apparatus, the actuator and the frictional engagement portion are offset in a rotational axial direction of the first and second rotational members.

Further, it is more preferable that the torque transmission apparatus further comprises a cancellation portion, for canceling or reducing the thrust between the first and the second members produced by a drag torque, provided at one of a first portion between the penetrating portion and the transmission member and a second portion in the pressurizing member.

Further, it is more preferable that, in the torque transmission apparatus, the cancellation portion includes a cam surface.

Further, it is more preferable that the torque transmission apparatus further comprises a damper mechanism for damping an inertia force on the actuator side and a thrust produced by the inertia force applied to the pressurizing member.

Further, it is more preferable that the torque transmission apparatus further comprises a controller controlling the actuator, to drive the pressurizing member relatively fast when the actuator removes a play in a rotating direction of the pressurizing member, and to drive the pressurizing member relatively slow when the removal of the play is completed.

Further, it is more preferable that the torque transmission apparatus further comprises a controller controlling the actuator, according to a condition of an automobile, to hold the pressurizing member on standby at a neutral position where there exists a play and at a play removed position where there exist no or little play.

Further, it is more preferable that the torque transmission apparatus further comprises a positioning portion formed on the casing for positioning the pressurizing member in the rotating direction and enabling to assemble the pressurizing member, wherein the positioning portion maintains a neutral position of the pressurizing member.

Further, it is more preferable that the torque transmission apparatus further comprises a rotation coupling member disposed between the actuator and the pressurizing member; and a controller controlling the rotation coupling member, to be in a rotation engaging state for producing the thrust when the actuator rotates to drive the pressurizing member, and to be in a rotation disengaging state for releasing the thrust.

Further it is more preferable that, in the torque transmission apparatus, the rotation coupling member is disposed on the actuator, and the rotation coupling member engages or disengages a rotational driving of a rotating drive shaft of the actuator.

Further it is more preferable that, the torque transmission apparatus further comprises a boss portion formed on the first rotational member; and an oil pump supported on the casing, and engaged with the boss portion in an interlocking fashion.

Furthermore, the torque transmission apparatus may be constructed as a starter clutch disposed on an output side of an engine or a torque transmission apparatus disposed in any one of an output side of transfer apparatus of a four-wheel-drive vehicle, an input side of rear differential, a propeller shaft between the transfer and the rear differential, front axle shafts and rear axle shafts.

According to the invention, since the torque transmission apparatus comprises a casing; a first rotational member disposed in the casing; a second rotational member disposed relatively rotatable to the first rotational member; a frictional engagement portion provided between the first and second rotational members for transmitting torque according to an engaging force; a pressurizing member, including first and second members relatively rotatable to each other, that produces a thrust through relative rotation between the first and the second members for bringing the frictional engagement portion into friction engagement; and a actuator supported on the casing for rotationally driving at least one of the first and second members to generate the relative rotation, when at least one of the pressurizing member is driven to rotate by the actuator, there occurs relative rotation between the first and second members to thereby produce a thrust, thereby making it possible to bring the frictional engagement portion into frictional engagement. Consequently, the transmission of torque can be engaged or disengaged between the first rotational member and the second rotational member.

Further, since the torque transmission apparatus is constructed so that the pressurizing member is disposed on an inner radial side of the frictional engagement portion, an effective radius of the frictional engagement become increased, and a down-sizing of the whole apparatus can be achieved as a result.

Moreover, since the first rotational member comprises in at least one of the directions along the axis of rotation the outer wall which extends towards the inner circumferential side in the direction along the rotating radius, the second rotational member comprises the connecting wall which extends along the outer wall, the accommodating recessed portion which is formed in such a manner as to enter the inner circumferential side of the second rotational member is provided in the outer wall, the pressurizing member is disposed in the accommodating recessed portion, the penetrating portion which confronts the pressurizing member is provided in the outer wall, and the transmission member interposed between the pressurizing member and the connecting wall of the second rotational member for transferring a thrust of the pressurizing member to the second rotational member is disposed in the penetrating portion so as to pass therethrough, the necessity is obviated that the frictional engagement portion and the pressurizing member are provided in series in the direction along the axis of rotation.

Due to this, the increase in overall size of the apparatus can be suppressed by making the apparatus compact in size in the direction along the axis of rotation while attempting to increase the friction radius of the frictional engagement portion.

Moreover, since the pressurizing member is disposed on the outer wall side of the connecting wall, a down-sizing of the whole apparatus can be achieved as a result.

Furthermore, since a driving member for connecting at one side to the actuator and at the other side to one of the first and second members of the pressurizing member is arranged to step over the first and second rotational members, a freedom of an arrangement of the actuator become increased.

Furthermore, since the actuator and the frictional engagement portion are offset in a rotational axial direction of the first and second rotational members, a space for disposing the actuator can be obtained without increasing the radial size of the whole apparatus.

In addition, according to the invention, since the cancellation portion for canceling or reducing a thrust produced by a drag torque received by the pressurizing member is provided between the penetrating portion and the transmission member or in the pressurizing member, a thrust produced by the drag torque received by the pressurizing member can be cancelled or reduced, whereby the frictional engagement of the frictional engagement portion by the drag torque can be suppressed, thereby making it possible to implement an accurate engagement or disengagement of the transmission of torque.

Moreover, according to the invention, since the cancellation portion includes a cam surface, the drag torque can be cancelled or reduced by the cam surface in an ensured manner, whereby a more accurate engagement or disengagement of the transmission of torque can be ensured.

Moreover, according to the invention, since the damper mechanism is provided for damping an inertia force on the actuator side or a thrust produced when the inertia force is applied to the pressurizing member, a temporary rise in frictional engagement force of the frictional engagement portion due to the influence of the inertia force, and a smooth engagement or disengagement of the transmission of torque can be implemented with little shock accompanied.

In addition, according to the invention, since the control means is provided for controlling the actuator such that the rotational driving of the member is made relatively fast when a play in the rotating direction of the pressurizing member is being removed and is made relatively slow when the removal of play is completed, the removal of play at the pressurizing member can be implemented quickly from the neutral position side where the play is large by the relatively fast rotational driving of the actuator, and when a thrust is produced as a result of the removal of play, the actuator can be rotationally driven relatively slowly, so that the influence of the inertial force on the actuator side to the pressurizing member can be suppressed. Due to this, the temporary rise in frictional force of the frictional engagement portion through the influence of the inertial force of the actuator can be suppressed, thereby making it possible to implement a smooth engagement or disengagement of the transmission of torque with little shock.

Moreover, according to the invention, since the control means is provided for controlling the actuator such that the pressurizing member is made to stand by at the neutral position where there exists a play and at a play removed position where there exists no or little play according to the condition of an automobile, the frictional engagement portion can quickly be brought into frictional engagement according to the condition of the automobile so as implement a torque transfer.

In addition, by making the pressurizing member stand by at the neutral position where there exists a play, a gap at the frictional engagement portion can be secured accurately, whereby the drag torque at the frictional engagement portion can be suppressed, thereby making it possible to implement an accurate disengagement of the transmission of torque.

Moreover, according to the invention, since the positioning portion is provided on the fixed side for enabling an assembly of the pressurizing member with the members of the pressurizing member being positioned in the rotational direction, whereby the members are positioned by the positioning portion, so that the neutral position of the pressurizing member is held, when installing the frictional engagement portion, the frictional engagement portion can easily be held without confirming visually the neutral position of the pressurizing member, whereby the assembly of the frictional engagement portion and the pressurizing member can be implemented accurately and easily.

Moreover, according to the invention, since the rotation coupling member is provided between the actuator and the pressurizing member, and the control means is provided for controlling the rotation coupling member such that when the member is rotationally driven through the rotational driving of the actuator so as to produce a thrust, the rotation coupling member is put in a rotation engaging state, whereas the rotation coupling member is put in a rotation disengaging state so as to release the thrust, when the frictional engagement portion is brought into frictional engagement, the rotation coupling member is put in the rotation engaging state, so that the member of the pressurizing member can be driven to rotate while the speed thereof is being largely reduced by the rotational actuator. The pressurizing member produces a thrust when being driven to rotate in such a way so as to bring the frictional engagement portion into frictional engagement.

Consequently, the frictional engagement of the frictional engagement portion can be ensured by a small rotational actuator, thereby making it possible to attempt to make the apparatus small in size and light in weight.

When attempting to release the frictional engagement of the frictional engagement portion, in the event that the rotation coupling member is put in the rotation disengaging state so as to release the thrust, the frictional engagement of the frictional engagement portion is released immediately in association with the shift of the state of the rotation coupling member.

Consequently, even if the member of the pressurizing member is constructed so as to be largely reduced in rotational speed by the rotational actuator, the responsiveness to an attempt to release the engagement can be improved remarkably.

According to the invention, since the rotation coupling member is provided on the rotational actuator, whereby the rotational driving of the rotating drive shaft of the rotational actuator is engaged or disengaged by the rotation coupling member, the rotational actuator and the rotation coupling member can be handled together as a single unit, and this reduces the number of constituent components, thereby facilitating the assembly and control of components involved.

According to the invention, since the boss portion on the first rotational member engages with an oil pump supported on the fixed side in an interlocking fashion, the oil pump can be driven to rotate via the first rotational member.

Furthermore, according to the invention, since the torque transmission apparatus is constructed as a starter clutch disposed on an output side of an engine or a torque transmission apparatus disposed in any one of an output side of transfer apparatus of a four-wheel-drive vehicle, an input side of rear differential, a propeller shaft between the transfer and the rear differential, front axle shafts and rear axle shafts, the apparatus can implement the engagement or disengagement of the transmission of torque accurately as any of the starter clutch and the respective torque transfer devices.

BRIEF DESCRIPTION OF THE DRAWING

FIG. 13A is a front view of a pressurizing member in a large play state according to a third embodiment with part being omitted.

FIG. 13B is a front view of the pressurizing member in an intermediate play state with part being omitted.

FIG. 13C is a front view of the pressurizing member in a small play state with part being omitted.

DESCRIPTION OF THE PREFERRED EMBODIMENT

First Embodiment

Figure 1:
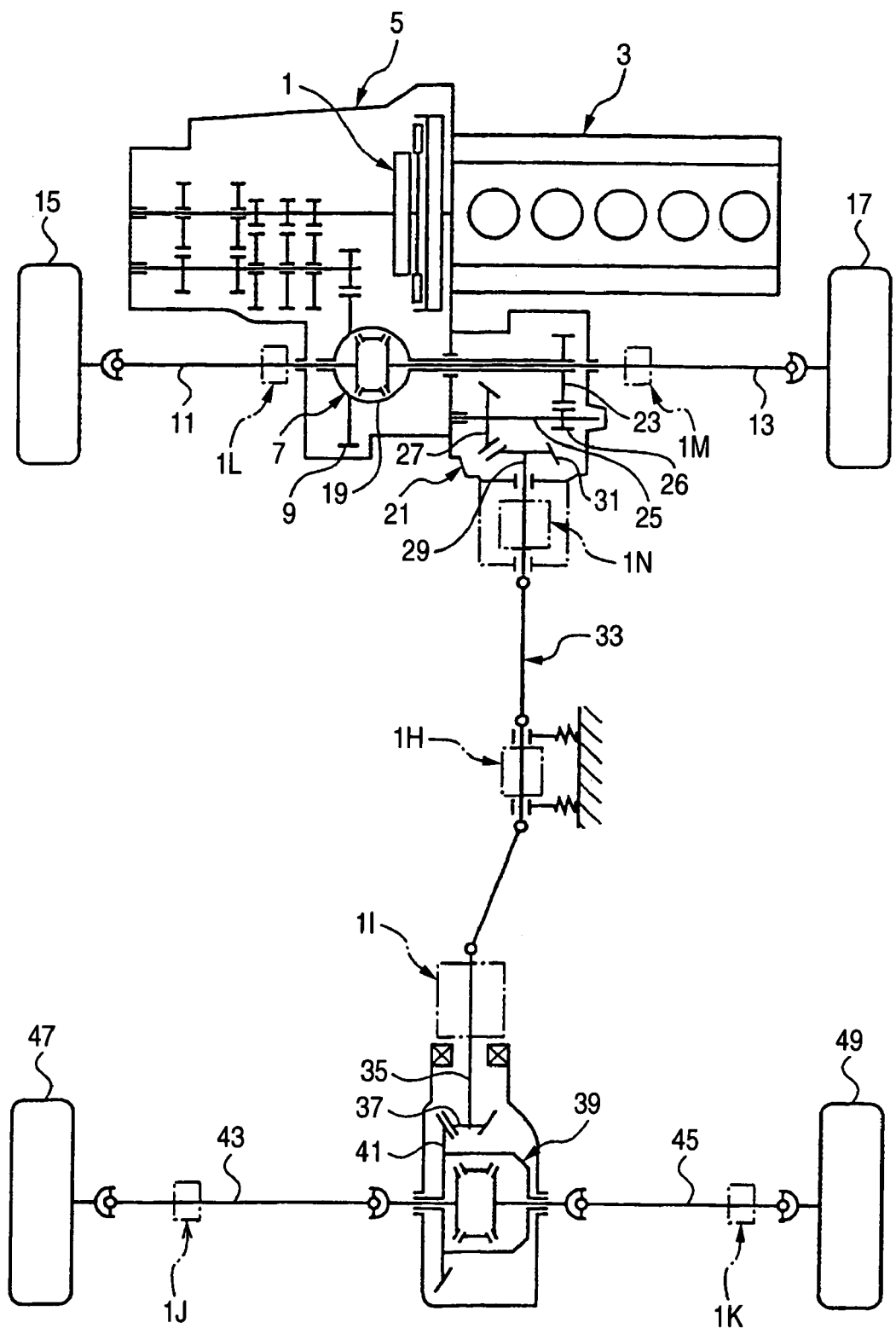
FIG. 1 is a skeleton plan view of a four-wheel-drive vehicle illustrating the position of a starter clutch according to a first embodiment of the invention.

FIG. 1 is a skeleton plan view of a four-wheel-drive vehicle illustrating the position of a starter clutch as a torque transmission apparatus according to a first embodiment of the invention.

As shown in FIG. 1, a starter clutch 1, which is a torque transmission apparatus according the invention, is disposed on an output side of an engine 3. A transmission 5 is connected to an output side of the starter clutch 1. As the transmission 5, an automatic transmission (AT), a continuously variable transmission (CVT) using a metallic change constituted by a plurality of belt plates, or a manual transmission (MT) having a multiplicity of gears is adopted.

An output torque from the transmission 5 is designed to be inputted to a ring gear 9 of a front differential 7. Left and right front wheels 15, 17 are connected in an interlocking fashion to the front differential 7 via left and right axle shafts 11, 13.

A spur gear 23 is connected to a differential case 19 of the front differential 7 on a transfer 21 side. The spur gear 23 meshes with a spur gear 26 of a transmission shaft 25. A bevel gear 27 is attached to the transmission shaft 25 to mesh with a bevel gear 31 attached to an output shaft 29 to a rear wheels side.

The output shaft 29 to the rear wheels side is connected to a driving pinion shaft 35 via a propeller shaft 33. A drive pinion gear 37 provided on the drive pinion shaft 35 meshes with a ring gear 41 of a rear differential 39. Left and right rear wheels 47, 49 are connected in an interlocking fashion to the rear differential via left and right axle shafts 43, 45.

Then, when the starter clutch 1 is engaged so as to transfer torque, a torque is transferred from the engine 3 to the ring gear 9 of the front differential 7 via the transmission 5. When the torque is so transferred to the ring gear 9, on one hand, the torque is then transferred from the front differential 7 to the left and right front wheels 15, 17 via the left and right axle shafts 11, 13.

On the other hand, the torque is transferred from the differential case 19 of the front differential 7 to the spur gear 23 on the transfer 21 side, and the torque is then transferred to the ring gear 41 of the rear differential 39 via the spur gear 26, the transmission shaft 25, the bevel gears 27, 31, the output shaft 29, the propeller shaft 33, the drive pinion shaft 35, and the drive pinion gear 37. The torque is then transferred from the rear differential 39 to the left and right rear wheel 47, 49 via the left and right axle shafts 43, 45.

Consequently, the automotive vehicle can drive on the front wheels 15, 17 and the rear wheels 47, 49 in a four-wheel-drive state.

In addition, when the automotive vehicle is in a parked state, the starter clutch 1 is disengaged so as not to transfer any torque, and the torque from the engine 3 is transferred to the transmission 5 in no case. Consequently, the members on the transmission 5 side are caused to rotate uselessly, whereby the fuel consumption can be attempted to be improved.

Figure 2:
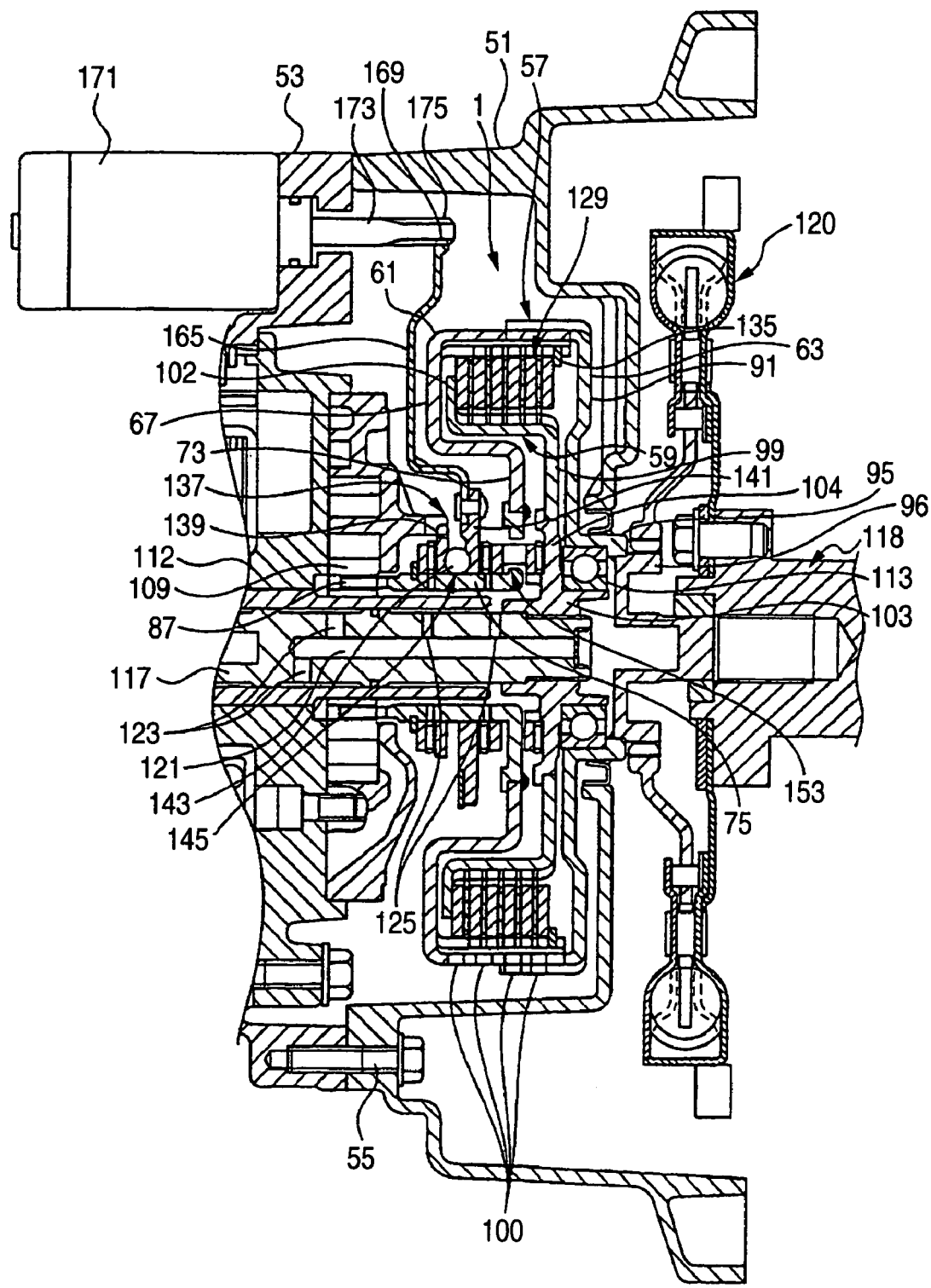
FIG. 2 is a cross-sectional view showing the starter clutch and the periphery thereof according to the first embodiment of the invention.
Figure 3:
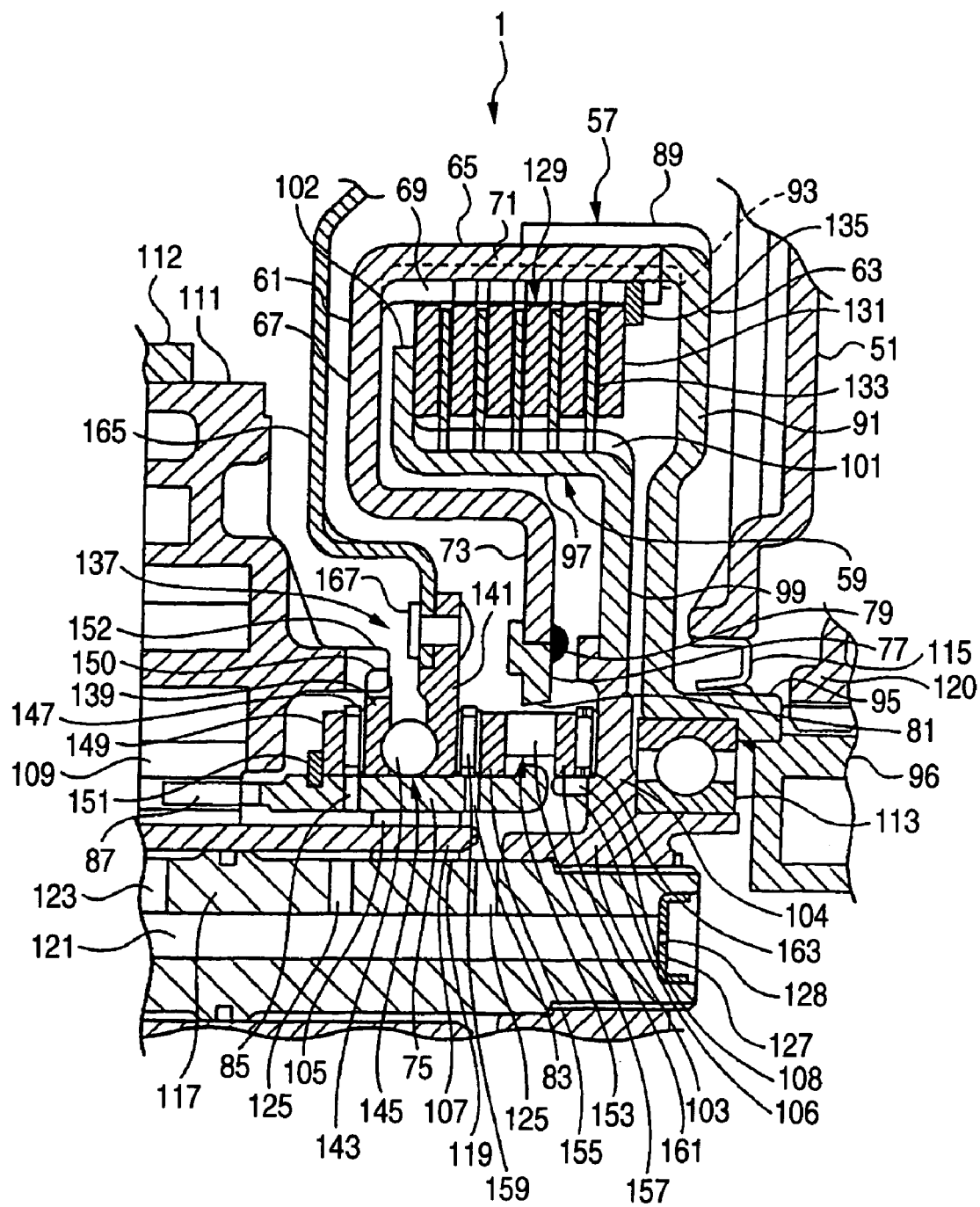
FIG. 3 is an enlarged cross-sectional view of a main part of the first embodiment.

The details of the starter clutch 1 is as shown in FIGS. 2, 3. FIG. 2 is a cross-sectional view of the starter clutch according to the first embodiment, and FIG. 3 is an enlarged cross-sectional view of a main part thereof.

As shown in FIGS. 2, 3, the starter clutch 1 is disposed to be accommodated within a casing 51 which constitutes a fixed side. The casing 51 is interposed between a cylinder block of the engine 3 and a transmission case 53 of the transmission 5 and is securely fastened with bolts 55, for example, at a plurality of locations.

The starter clutch 1 includes a clutch housing 57 (as a first rotational member 57) and a clutch hub 59 (as a second rotational member 59) which is relatively rotatable to the clutch housing. The clutch housing 57 and the clutch hub 59 are rotationally supported on the casing 51 side and are such as to implement input, output and transmission of torque.

The clutch housing 57 includes a main body portion 61 and an end plate portion 63. Both the main body portion 61 and the end plate portion 63 are formed of sheet metal through pressing.

The main body portion 61 includes an engaging circumferential wall 65 located on an outer circumferential side in a direction along a rotating radius and an outer wall 67 located either at front or at rear in a direction along an axis of rotation.

A splined portion 69 is provided on an inner surface of the engaging circumferential wall 65. Engaging grooves 71 are provided circumferentially at predetermined intervals in an outer circumferential surface of the engaging circumferential wall 65. A plurality of through holes are formed in the engaging circumferential wall 65 in such a manner as to penetrate therethrough in the rotating radius direction, so that a lubricating oil is allowed to pass between an inner circumferential side and an outer circumferential side of the engaging circumferential wall 65.

The outer wall 67 is formed in such a manner as to extend towards the inner circumferential side in the direction along the rotating radius. An accommodating recessed portion 73 is formed in the outer wall 67 in such a manner as to enter an inner circumferential side of the clutch hub 59. A plurality of through holes 100 (FIG. 2) are formed in the outer wall 67 on the accommodating recessed portion 73 side in such a manner as to penetrate therethrough in the rotating radius direction, so that a lubricating oil is allowed to pass between the accommodating recessed portion 73 side and an outer circumferential side of the outer wall 67. A boss portion 75 is provided on the outer wall 67 as an integral part thereof. The boss portion 75 is formed through forging and includes a circumferential flange portion 77 extending in the direction along the rotating radius. The flange portion 77 is fixed secured to an inner edge side of the outer wall 67 at the accommodating recessed portion 73 through welding 79. Consequently, the flange portion 77 constitutes part of the outer wall 67 and makes up the accommodating recessed portion 73.

A plurality of penetrating portions 81 are provided in the flange portion 77 in such a manner as to penetrate the flange portion 77 in the direction along the axis of rotation. The plurality of penetrating portions 81 are provided at predetermined intervals in a circumferential direction, for example.

Pluralities of oil holes 83, 85 which each extend along the rotating radius direction are provided in the boss portion 75 at a predetermined interval in the direction along the axis of rotation, and the respective oil holes are provided at predetermined intervals in a circumferential direction. An engaging portion 87 is provided at an end portion of the boss portion 75.

The end plate portion 63 is made up of a connecting circumferential wall 89 and an outer wall 91.

The connecting circumferential wall 89 is provided circumferentially on an outer circumferential side in the direction along the rotating radius, and engaging elongate projections 93 extending in the direction along the axis of rotation are provided at predetermined intervals on an inner circumferential surface of the connecting circumferential wall 89. A plurality of through holes 100 (FIG. 2) are formed in the connecting circumferential wall 89 in such a manner as to penetrate therethrough in the rotating radius direction, so that a lubricating oil is allowed to pass through the connecting circumferential wall 89 between an inner circumferential side and an outer circumferential side thereof. The connecting circumferential wall 89 fits on the outer circumferential side of the engaging circumferential wall 65 from the direction along the axis of rotation with the engaging elongate projections 93 engaging with the engaging grooves 71.

The outer wall 91 confronts the outer wall 67, which is one of the outer walls, in the direction along the axis of rotation. Consequently, the clutch housing 57 is formed in general so as to have a closed cross-sectional shape. A boss portion 95 is provided on an inner circumferential edge side of the outer wall 91. A connecting body 96 is connected to the boss portion 95 through welding as an integral part thereof.

The clutch hub 59 is formed of sheet metal through pressing and has an engaging circumferential wall 97, a connecting wall 99 and a pressing portion 102.

A splined portion 101 is provided on an outer circumferential surface of the engaging circumferential wall 97. A plurality of through holes are provided in the engaging circumferential wall 97 in such a manner as to penetrate therethrough in the rotating radius direction, so that a lubricating oil is allowed to pass through the engaging circumferential wall 97 between an inner circumferential side and an outer circumferential side thereof.

The connecting wall 99 is positioned between the outer walls 67, 91 of the clutch housing 57 and extends in the rotating radius direction along the outer walls 67, 91. A boss portion 103 which is formed through forging is connected to an inner circumferential edge of the connecting wall 99 as an integral part thereof. Flange portion 104 and a ring support portion 106 are provided on the boss portion 103 as integral parts thereof.

The flange portion 104 is fixedly secured integrally to the connecting wall 99 through press fitting or welding and makes up part of the connecting wall 99. The ring support portion 106 is provided circumferentially, and a plurality of recessed portion 108 are provided in the ring support portion at predetermined intervals in the circumferential direction for allowing a lubricating oil to pass therethrough.

Then, the boss portion 75, which is one of the boss portions of the clutch housing 57, is rotationally supported on a support cylinder 107 on the transmission case 53 side via needle bearings 105. The engaging portion 87 of the boss portion 75 engages with an oil pump 109. The oil pump 109 is provided in a pump housing 111. The pump housing 111 is attached to a wall member 112 provided on the transmission case 53 side.

The other boss portion 95 of the clutch housing 57 is supported on the boss portion 103 on the clutch hub 57 side via bearings 113 in such a manner as to rotate relative to the boss portion 103. A seal 115 is interposed between the boss portion 95 and the casing 51. A distal end of the connecting body 96 of the boss portion 95 fits on an end portion of a crankshaft 118 in such a manner as to rotate relatively. A damper 120 meshes with the connecting body 96 a tone end thereof. The damper 120 connects to the crankshaft 118 at the other end thereof.

The boss portion 103 of the clutch hub 59 spline fits on an input shaft 117 on the transmission 5 side. The input shaft 117 is supported on an inner circumferential surface of the support cylinder 107 via needle bearings 119 in such a manner as to freely rotate.

An oil hole 121 which extends in the direction along the axis of rotation and oil holes 123, 125 which extend along the rotating radius direction are provided in the input shaft 117. The oil hole 123 communicates with the oil pump 109 side. The oil hole 125 is such as to discharge oil from the oil hole 121 side in the rotating radius direction so as to be supplied to a frictional multi-plate clutch, which will be described later on.

An end portion of the oil hole 121 is closed by a lid member 127 having a through hole 128.

A frictional multi-plate clutch 129 is provided, as a frictional engagement portion, between the clutch housing 57 and the clutch hub 59. The frictional multi-plate clutch 129 is such as to be brought into frictional engagement according to engaging force so as to transmit torque between the clutch housing 57 and the clutch hub 59.

Outer plates 131 of the frictional multi-plate clutch 129 spline engage with the splined portion 69 on the clutch housing 57 side, and inner plates 133 spline engage with the splined portion 101 on the clutch hub 59 side.

A stopper ring 135 is fixed to an inner circumferential surface of the engaging circumferential wall 65 for securely receiving the engaged frictional multi-plate clutch 129.

A pressurizing member 137 is disposed on the boss portion 75. The pressurizing member 137 is disposed in the accommodating recessed portion 73 of the clutch housing 57 and is positioned on inner circumferential sides of the engaging circumferential wall 65 of the clutch housing 57 and the engaging circumferential wall 97 of the clutch hub 59.

The pressurizing member 137 includes a pair of members 139, 141 that can rotate relative to each other. The members 139, 141 are each formed into a doughnut shape, and a cam mechanism 145 having a ball 143 is provided between both the members. The cam mechanism 145 is such as to produce a thrust in the direction along the axis of rotation through relative rotation between the members 139, 141. The pressurizing member 137 is such as to pressurize and bring the frictional multi-plate clutch 129 into frictional engagement by virtue of the thrust so produced.

An engagement portion 150 is provided on an outer circumferential surface of the member 139 and is locked relative to the rotating direction on a locking portion 152 of the pump housing 111. A back side of the member 139 is supported on a stopper ring 149 via needle bearings 147, and the stopper ring 149 is positioned at the boss portion 75 in the direction along the axis of rotation by a snap ring 151. The needle bearings 147 correspond in position to the oil holes 85, which are one of the arrays of oil holes arranged circumferentially, around an outer circumference of the boss portion 75.

A transmission member 153 is interposed between the pressurizing member 137 and the flange portion 104 on the clutch hub 59 side. The transmission member 153 is such as to be interposed between the pressurizing member 137 and the flange portion 104 which makes up the connecting wall of the clutch hub 59 so as to transfer the thrust of the pressurizing member 137 to the clutch hub 59.

The transmission member 153 is disposed in such a manner as to pass through the penetrating portions 81. The transmission member 153 is made up of a ring-like base portion 155 and a plurality of abutment portions 157 provided integrally on the base portion 155 so as to pass through the penetrating portions 81. The plurality of abutment portions 157 are provided circumferentially at predetermined intervals in such a manner as to correspond to the through holes 81.

A back side of the base portion 155 abuts with the member 141 side via needle bearings 159. The needle bearings 159 correspond to the oil holes 83, which are the other array of oil holes arranged circumferentially, around the outer circumference of the boss portion 75.

The abutment portions 157 abut with a ring 161 supported on a ring support portion 106 of the flange portion 104. The ring 161 abuts with the flange portion 104 side via needle bearings 163.

An inner circumferential edge side of a gear plate 165 (as a driving member 165) is fixed to an outer circumferential portion of the member 141 by a fastened rivet 167. The gear plate 165 is formed such that a cross section thereof bends and extends from the accommodating recessed portion 73 towards the outer circumferential side, so that the gear plate steps over the clutch housing 57. An outer circumferential side of the gear plate 165 is formed into a fan shape, and a gear is provided in an outer circumferential surface of the gear plate 165.

A motor 171 is fixed to the transmission case 53 side as a rotational actuator. A rotating drive shaft 173 of the motor 171 is disposed in such a manner as to protrude into the casing 51, and in such a manner that the friction engagement member 129 and the motor 171 are offset in an rotational axis direction of the clutch housing 57 and the clutch hub 59. A gear 175 is provided on the rotating drive shaft 173 and meshes with the gear 169 of the gear plate 165. There is provided a large gear ratio between the gears 175, 169.

When the rotating drive shaft 173 is driven to rotate by the motor 171 through a predetermined angle, the gear plate 165 rotates at reduced speeds via the gears 175, 169. When the gear plate 165 rotates at reduced speeds, the member 141 of the pressurizing member 137 rotates in the same direction. The member 139 of the pressurizing member 137 is locked relative to the rotating direction to the pump housing 111 side which is the fixed side via the engagement portion 150 and the locking portion 152. Due to this, a relative rotation through the predetermined angle is generated between the members 139, 141 as the member 141 rotates.

The cam mechanism 145 is caused to work by this relative rotation, and the pressurizing member 137 produces a thrust in the direction along the axis of rotation. This thrust so produced is received by the boss portion 75 side via the member 139, the needle bearings 147, the stopper ring 149 and the snap ring 151. A thrust is applied to the member 141 as a reaction force from the boss portion 75, whereby the member 141 moves to the transmission member 153 side.

The flange portion 104 is then pressed via the needle bearing 159, the transmission member 153, the ring 161 and the needle bearings 163 as the member 141 moves. The entirety of connecting wall 99 moves in the same direction as the flange portion is pressed, and the frictional multi-plate clutch 129 is engaged relative to the stopper ring 135 by the pressing portion 102.

A force received by the stopper ring 135 when the frictional multi-plate clutch 129 is engaged is then received by the main body portion 61 side of the clutch housing 57 and is inputted to the boss portion 75 side via the outer wall 67. Consequently, an engaging force of the frictional multi-plate clutch 129 by virtue of the thrust of the cam mechanism 145 can be absorbed between the main body portion 61 of the clutch housing 57 and the boss portion 75.

Then, by virtue of the engagement of the frictional multi-plate clutch, the frictional multi-plate clutch 129 is brought into frictional engagement according to the engaging force, and the starter clutch 1 is put in a torque transmission state.

Consequently, a torque is transmitted from the crankshaft 118 of the engine 3 to the clutch housing 57 via the damper 120, whereby the torque can be transferred from the frictional multi-plate clutch 129 to the input shaft 117 on the transmission 5 side via the clutch hub 59.

The torque is transferred from the transmission 5 as has been described previously, whereby the automotive vehicle can drive on the front wheels 15, 17 and the rear wheels 47, 49 in the four-wheel-drive condition.

When the rotation of the motor 171 is returned to an original position, the member 141 rotating and moving in an opposite direction relative to the member 139, the pressurizing member 137 returns to a neutral position where no thrust is produced by the cam mechanism 145. The engagement of the frictional multi-plate clutch 129 is released when this neutral position is attained, and the starter clutch 1 is put in a torque transmission disengaging state, whereby the torque transfer between the crankshaft 118 and the input shaft 117 is disengaged.

In the event that the gear shift position of the transmission 5 is at the neutral N position or the Parking position P, for example, a controller as a control means is read in the shift position, and the controller controls the starter clutch 1 so as to be put in the torque transmission disengaging state, whereby the torque transmission between the engine 3 and the transmission 5 is disengaged, so that the members of the transmission 5 do not rotate uselessly, thereby making it possible to improve the fuel consumption.

In addition, when the gear shift position of the transmission 5 is at any other position than the N, P positions, the starter clutch 1 is put in the torque transmission engaging state so that a torque transmission from the crankshaft 118 to the input shaft 117 can be implemented to thereby allow for a smooth driving of the automotive vehicle.

When the engine 3 is rotating, rotation is transmitted from the crankshaft 118 to the clutch housing side 57 at all times, whereby the oil pump 109 is driven to rotate through the engaging portion 87 of the boss portion 75 which rotates together with the clutch housing 57.

Figure 4:
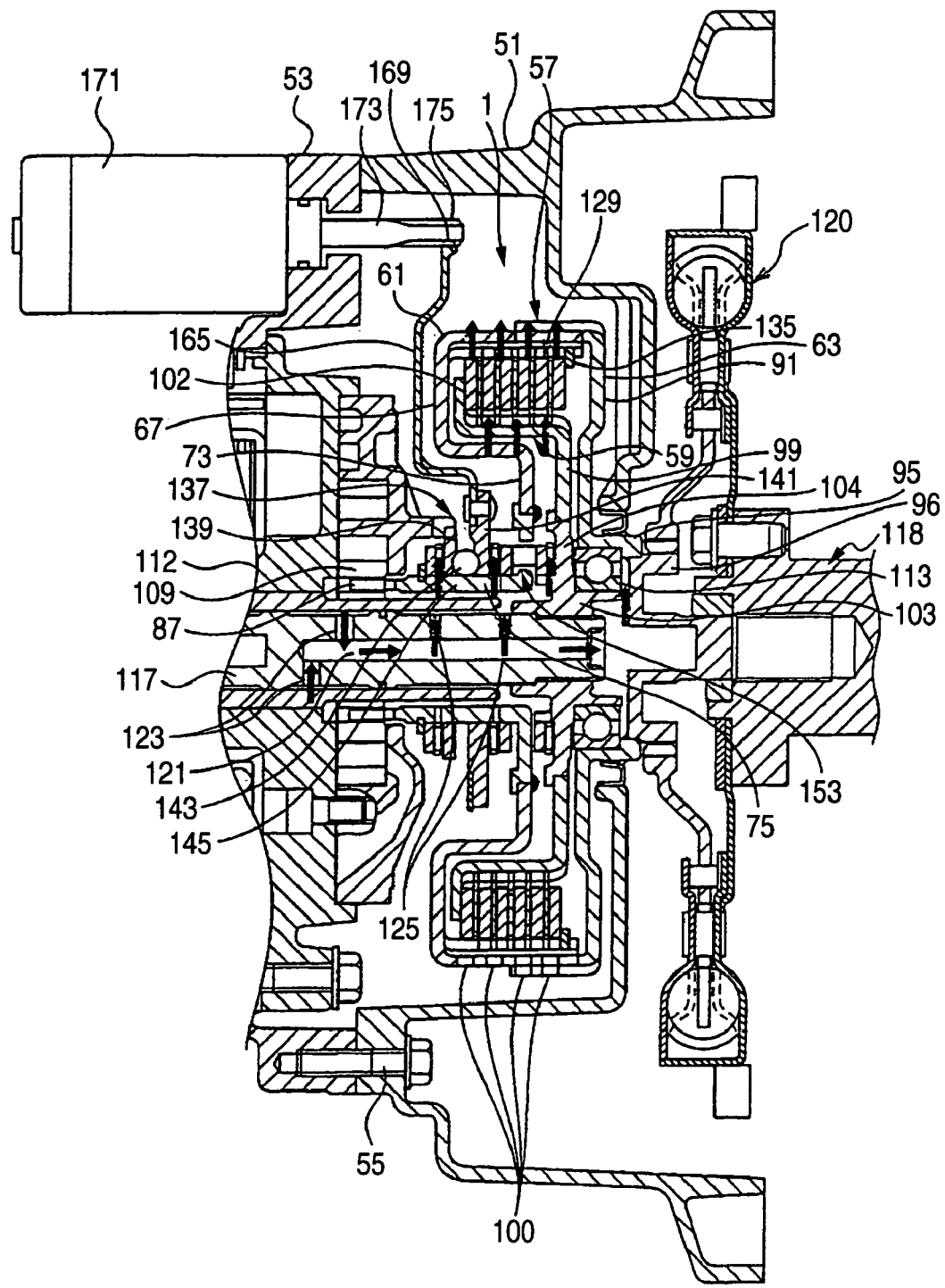
FIG. 4 is across-sectional view illustrating the starter clutch and the periphery thereof of the first embodiment of the invention which shows flows of oil.

FIG. 4 is a cross-sectional view illustrating a flow of a lubricating oil resulting from the driving of the oil pump 109.

As shown by arrows painted black in FIG. 4, oil flows from the oil hole 123 into the oil hole 121 as the oil pump 109 is driven and then flows out from the oil holes 125 and the through hole 128 via the oil hole 121.

The oil that has flowed out from the oil holes 125 flows in between the input shaft 117 and the boss portion 75, then reaches from the oil holes 83, 85 that are located radially outwardly of the oil holes 125 and the recessed portion 108 to the respective needle bearings 149, 159, 163, and moves further to the outer circumferential side while lubricating the needle bearings 149, 159, 163.

The oil that has so moved to the outer circumferential side passes through the frictional multi-plate clutch 129 portion to move further to the outer circumferential side through the through holes formed in the accommodating recessed portion 167 side of the outer wall 67 and the through holes 100 (FIG. 2) formed in the engaging circumferential wall 65 and the connecting circumferential wall 89 of the clutch housing 57.

The portion such as the frictional multi-plate clutch 129 can be lubricated accurately when oil so moves.

In addition, oil that has flowed out from the through hole 128 lubricates bearings 113 on the outer circumferentil side.

Then, as has been described above, since the accommodating recessed portion 73 that is formed in such a manner as to enter the inner circumferential side of the clutch hub 59 is provided in the outer wall 67 of the clutch housing 57, the pressurizing member 137 is disposed in the accommodating recessed portion 73, the penetrating portions 81 are provided in the outer wall 67 in such a manner as to confront the pressurizing member 137, and the transmission member 153 which is interposed between the pressurizing member 137 and the flange portion 104 of the clutch hub 59 so as to transfer the thrust of the pressurizing member 137 to the clutch hub 59 is disposed in the penetrating portions 81 in such a manner as to penetrate the same portions, there is no need to provide the frictional multi-plate clutch 129 and the pressurizing member 137 in series in the direction along the axis of rotation.

Due to this, the frictional radius of the frictional multi-plate clutch can be attempted to be increased. Moreover, the torque transmission apparatus can be made compact in the direction along the axis of rotation, thereby making it possible to suppress the increase in overall size of the same apparatus.

Figure 5:
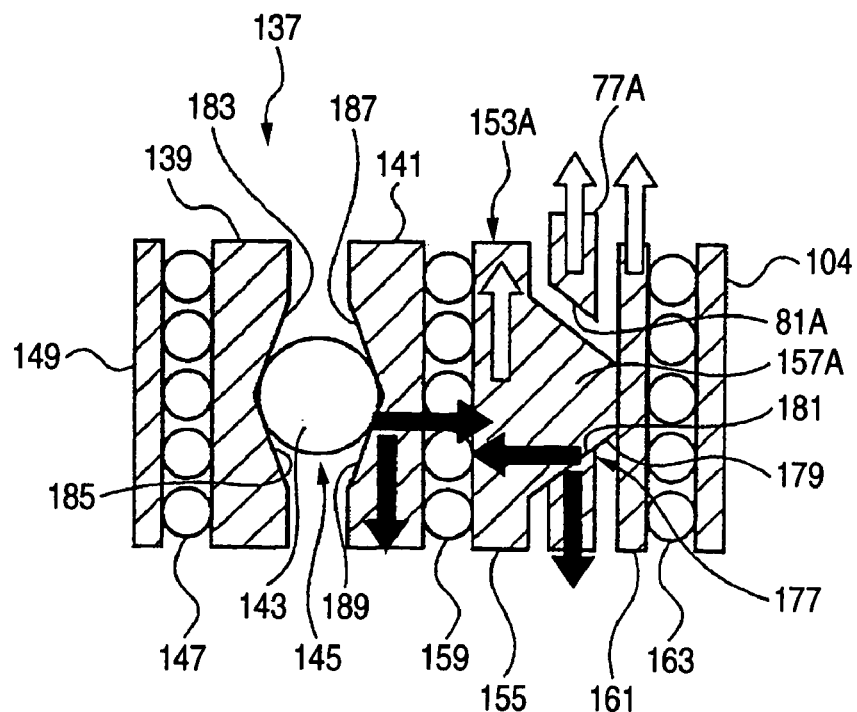
FIG. 5 is a deployed cross-sectional view of a main part in the vicinity of a pressurizing member and a transmission member according to a modified example of the first embodiment.

FIG. 5 shows an embodiment of a modified example of the first embodiment and is, more particularly, a deployed cross-sectional view of a main part in the vicinity of the pressurizing member and the transmission member. The starter clutch 1 is referred to with respect to the overall construction thereof.

In the starter clutch 1, even if it is not in the torque transmission engaging state, when the clutch housing 57 side rotates, the transmission member 153 rotates in the same direction. As this occurs, the needle bearings 159 are lubricated by oil at all times as has been described above, and the member 141 receives a drag toque in the same direction via the needle bearings 159 by virtue of the viscous action of oil as the transmission member 153 rotates and then attempts to rotate. Due to this, a relative rotation occurs due to the drag torque so received between the members 139, 141, and, as has been described before, a thrust is produced, so that the frictional multi-plate clutch 129 is brought into frictional engagement, whereby there may be caused a risk that a torque transfer is implemented due to the drag torque.

Then, as is shown in FIG. 5, in this embodiment, a cancellation portion 177 is provided between penetrating portions 81A and a transmission member 153A. The cancellation portion 177 is constructed so as to cancel a thrust produced by the drag torque received by the pressurizing member 137 so that the frictional multi-plate clutch 129 is not brought into engagement by the drag torque.

In this embodiment, the cancellation portion 177 is made up of a cam surface 179 provided on an abutment portion 157A of the transmission member 153A and a cam surface 181 provided on the penetrating portion 81A. The cam surfaces 179, 181 are formed into a symmetrical shape in the rotating direction.

Note that cam surfaces 183, 185 of the member 139 and cam surfaces 187, 189 of the member 141 which are brought into abutment with the ball 143 of the cam mechanism 145 are also formed into a symmetrical shape in the rotating direction.

Then, even in the event that the starter clutch 1 is not in the torque transmission engaging state, when the clutch housing 57 side rotates, the transmission member 153A rotates in the same direction. The rotating directions thereof as this occurs are illustrated by arrows painted white inside in FIG. 5.

As this occurs, the needle bearings 159 are, as has been described above, lubricated by oil at all times, and the member 141 receives a drag torque in the same direction via the needle bearings 159 by virtue of the viscous action of oil as the transmission member 153A rotates and then attempts to rotate.

When the member 141 is caused to rotate by this drag toque, the member 141 then rotates relative to the member 139, and the cam surfaces 189, 183 ride on the ball 143 to thereby produce a cam force. Directions of this cam force are shown by an arrow painted black which is directed rightward from the ball 143 side and an arrow painted black which is directed downward from the ball 143 side.

Then, in the event that the cancellation portion 177 is not provided, a thrust indicated by the black rightward arrow is produced by the cam mechanism 145 by the drag torque, and the trust so produced is then transmitted to the flange portion 104 side via the needle bearings 159, the transmission member 153A, the ring 161, and the needle bearings 163. Consequently, there may be caused a risk that the frictional multi-plate clutch 129 is engaged by the drag torque.

In this embodiment, however, since the cancellation portion 177 is provided as has been described above, when the clutch housing 57 side rotates as is described above, a flange portion 77A on the clutch hub 59 side being brought into abutment with the abutment portion 157A of the transmission member 153A, the cam surface 181 is then brought into abutment with the cam surface 179 to thereby produce force.

The force so produced is shown by an arrow painted black which is directed leftward from the flange portion 77A side and an arrow painted black which is directed downward from the flange portion 77A side. Since the force indicated by the black leftward arrow opposes the thrust indicated by the black rightward arrow which is produced by the drag torque and is set to a magnitude which can cancel the trust, there occurs no case where the transmission member 153A is caused to move by the thrust on the cam mechanism 145 side which is caused by the drag torque.

Consequently, there occurs no case where the frictional multi-plate clutch 129 is brought into engagement by the drag torque, thereby making it possible to ensure the implementation of engagement or disengagement of torque.

Namely, the engagement of the frictional multi-plate clutch 129 by the drag torque can be prevented or suppressed by the cancellation portion 177 both when the viscosity of lubricating oil is high and when the normal condition exists where the viscosity of the lubricating oil is low.

Since the cam surfaces 179, 181 are formed into the symmetrical shape in the rotating direction at the abutment portion 157A, the penetrating portion 81A, the construction of the cancellation portion 177 is not limited to one to be applied to the starter clutch 1. Namely, also in the event that the rotating direction of the clutch housing 57 that is used as various types of torque transmission apparatuses which will be described later on is not determined to be forward or backward, the engagement of the frictional multi-plate clutch 129 by the drag torque can be prevented or suppressed in the same manner.

Figure 6:
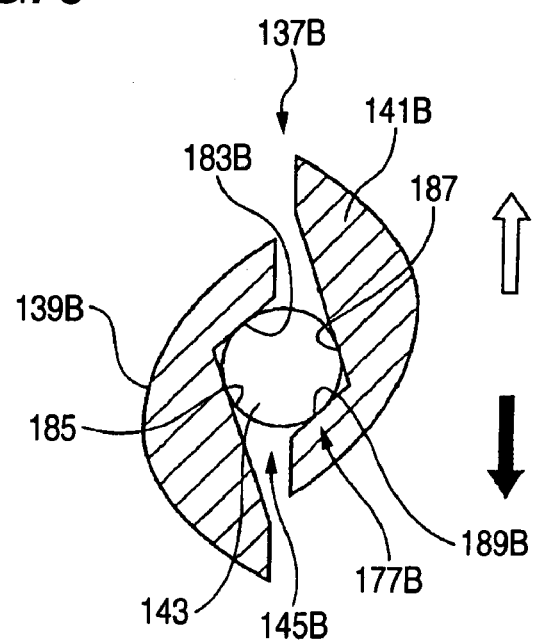
FIG. 6 is a deployed cross-sectional view of a main part of the pressurizing member according to another modified example of the first embodiment.

FIG. 6 shows an embodiment of another modified example of the first embodiment, and is, more particularly, a cross-sectional view of a main part of a pressurizing member. The starter clutch 1 is referred to with respect to the overall construction thereof.

An embodiment shown in FIG. 6 is such that a cancellation portion 177B is provided on a pressurizing member 137B. The cancellation portion 177B is such as to reduce a thrust produced by a drag torque that is received by the pressurizing member 137B.

The cancellation portion 177B is constructed by setting the angles of cam surfaces 183B, 185, 187, 189B suitably. Namely, the cam surfaces 183B, 189B are set such that inclinations thereof in the rotating direction become larger than those of the cam surfaces 185, 187.

In FIG. 6, an arrow painted white inside indicates the rotating direction of the clutch housing 57, and an arrow painted black indicates the direction of a force that is received by a member 141B as the motor 171 is driven to rotate.

Consequently, when the member 141B is driven to rotate by the motor 171 to thereby produce a relative rotation between members 139B, 141B, the cam surfaces 185, 187 ride on the ball 143, and a relatively large thrust is produced in the direction along the axis of rotation, whereby, as in the previous case, the frictional multi-plate clutch 129 can be engaged in an ensured fashion.

In addition, when the starter clutch 1 is not in the torque transmission engaging state, in the event that the clutch housing 57 side rotates and the member 141B receives a drag torque as in the previous case, the opposite cam surfaces 189B, 183B are caused to ride on the ball 143. As this occurs, a thrust in the direction along the axis of rotation can be reduced by setting the cam angles of the cam surfaces 189B, 183B, thereby making it possible to suppress the engagement of the frictional multi-plate clutch 129.

The embodiment shown in FIG. 6 is effective when the clutch housing 57 rotates in one direction, as in the case with the starter clutch 1.

Thus, in the embodiments shown in FIGS. 5, 6, since the cancellation portion 177, 177B is provided for canceling or reducing the thrust produced by the drag torque received by the pressurizing member 137, the thrust produced by the drag torque received by the pressurizing member 137 can be cancelled or reduced, whereby the frictional engagement of the frictional multi-plate clutch 129 by the drag torque can be suppressed, thereby making it possible to implement an accurate engagement or disengagement of torque.

Namely, power loss can be reduced by preventing or suppressing the drag torque of the frictional multi-plate clutch 129, thereby making it possible to improve the fuel consumption.

In addition, since the cancellation portions 177, 177B are made up of the cam surfaces 179, 181, 183B, 189B, the thrust produced by the pressurizing member 137 via the drag torque can be cancelled in the ensured manner by the cam surfaces 179, 181 or can be reduced in the ensured manner by the cam surfaces 183B, 189B, whereby a more ensured torque transmission engagement or disengagement can be implemented.

Second Embodiment

Figure 7:
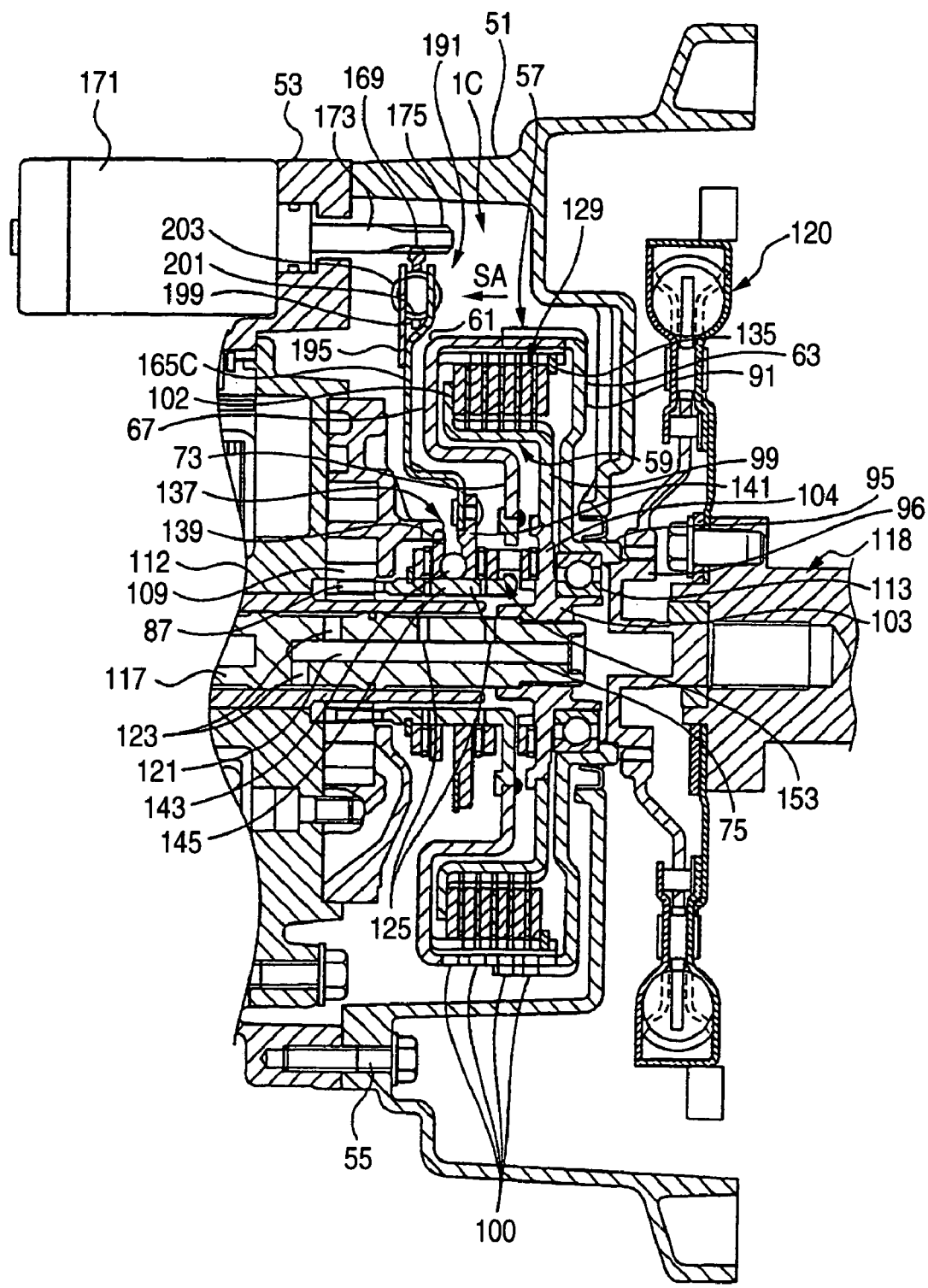
FIG. 7 is a cross-sectional view of a starter clutch and the periphery thereof according to a second embodiment of the invention.
Figure 8:
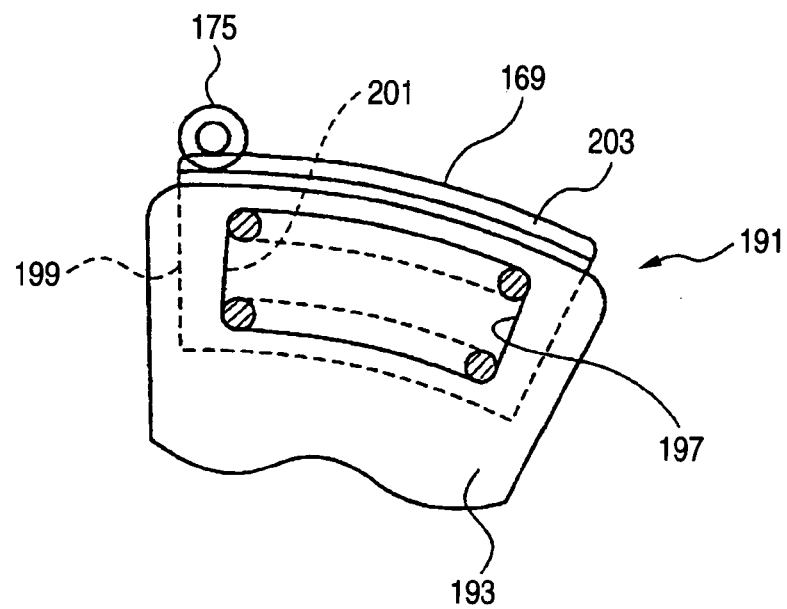
FIG. 8 is a front view of a main part of the second embodiment as seen in a direction indicated by SA in FIG. 7.
Figure 9A:
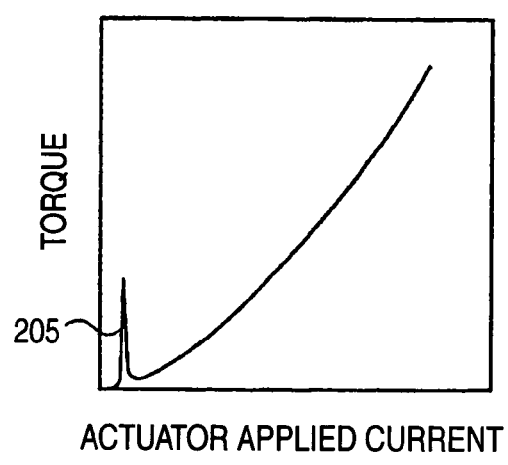
FIG. 9A is a graph illustrating a relationship between an actuator applied current and torque which explains a temporary rise by a drag torque.
Figure 9B:
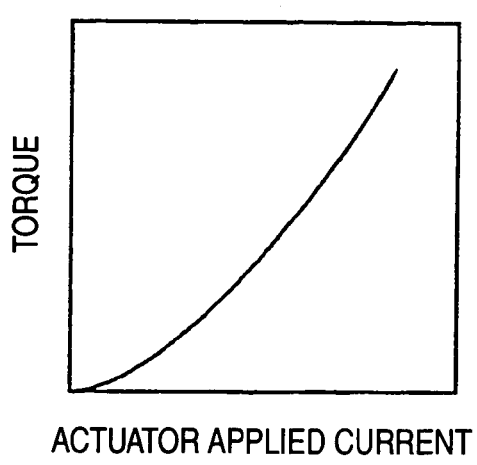
FIG. 9B is a graph illustrating a relationship between an actuator applied current and torque according to the second embodiment.

FIGS. 7 to 9 show a second embodiment of the invention, in which FIG. 7 is a cross-sectional view illustrating a starter clutch and the periphery thereof, and FIG. 8 is a front view of a main part of the starter clutch as viewed in a direction indicated by an arrow SA in FIG. 7. FIG. 9A shows a graph illustrating a relationship between a current applied to an actuator and torque for explanation of a temporary rise in the actuator-applied current by a drag torque, and FIG. 9B shows a graph illustrating a relationship between a current applied to the actuator and torque according to the second embodiment. Note that since the basic configuration of the second embodiment is similar to that of the first embodiment, in describing the second embodiment, like reference numerals are given to corresponding constituent portions.

In the previous starter clutch 1, in the event that the member 141 of the pressurizing member 137 is driven to rotate from the neutral position of the pressurizing member 137 by controlling the current of the motor 171 so as to produce a thrust, since a load applied to the motor 171 is extremely small until the play in the rotating direction between the ball 143 and the cam surfaces of the cam mechanism 145 is removed, the motor 171 rotates at high speeds.

Then, after the play in the cam mechanism 145 is removed, the thrust is produced, and a load applied to the motor 171 when the play is removed increases drastically as a reaction force. As this occurs, an inertial force resulting from rotating components within the motor 171 are applied to the pressurizing member 137 via the gear plate 165. The thrust produced in the cam mechanism 145 is caused to rise temporarily largely by the inertial force, and the frictional multi-plate clutch 129 is brought into engagement by the thrust caused to so rise temporarily, this tending to cause vibrations.

Then, a starter clutch 1 according to the embodiment is such that a damper mechanism 191 is provided between a motor 171 and a pressurizing member 137. The damper mechanism is such as to damp inertia force on the motor 171 side to thereby suppress a temporary large rise in thrust produced by a cam mechanism 145 by the inertial force.

The damper mechanism 191 is provided on a gear plate 165C (as a driving member 165C). A bent portion 193 is provided on the gear plate 165C. An auxiliary plate 195 is fixed to a root portion of the bent portion 193 through spot welding, whereby a support portion where a gap is spanned is constructed between the bent portion 193 and the auxiliary plate 195. A spring engaging window 197 is provided in each of the bent portion 193 and the auxiliary plate 195.

An idler plate 199 is interposed between the bent portion 193 and the auxiliary plate 195. A spring engaging window 201 is also provided in the idler plate 199.

A damping coil spring 203 is interposed in such a manner as to engage with each of the spring windows 197, 201.

The gear 169 is provided along an outer circumferential edge of the idler plate 199 so as to mesh with a gear 175 on the motor 171 side.

Then, when the thrust produced in the cam mechanism 145 is caused to rise temporarily largely by the inertial force of the motor 171 as has been described above, a frictional multi-plate clutch 129 is brought into engagement by the thrust that is caused to so rise temporarily, and as shown in FIG. 9A, a temporary increase 205 is called for in the rise in torque transmitted relative to a current applied to the motor 171, whereby a smooth rise in torque cannot be obtained.

In contrast to this, as has been described above, in the event that the inertial force on the motor 171 side is applied to the idler plate 199, the idler plate 199 moves relative to the bent portion 193 and the auxiliary plate 195 by provision of the damper mechanism 191. As this occurs, the coil spring 203 is compressed between the spring engaging windows 197, 201, the rotational drive force is transmitted while the inertial force on the motor 171 side is being damped.

Consequently, it is possible to suppress the transmission of the inertial force on the motor 171 side to the pressurizing member 137 side via the gear plate 165C.

As this occurs, the rise in torque transmitted by the frictional multi-plate clutch 129 relative to the current applied to the motor 171 can be made smooth as shown in FIG. 9B by suppressing the temporary increase 205 as shown in FIG. 9A, whereby a smooth engagement or disengagement of torque can be implemented with little shock.

Figure 10:
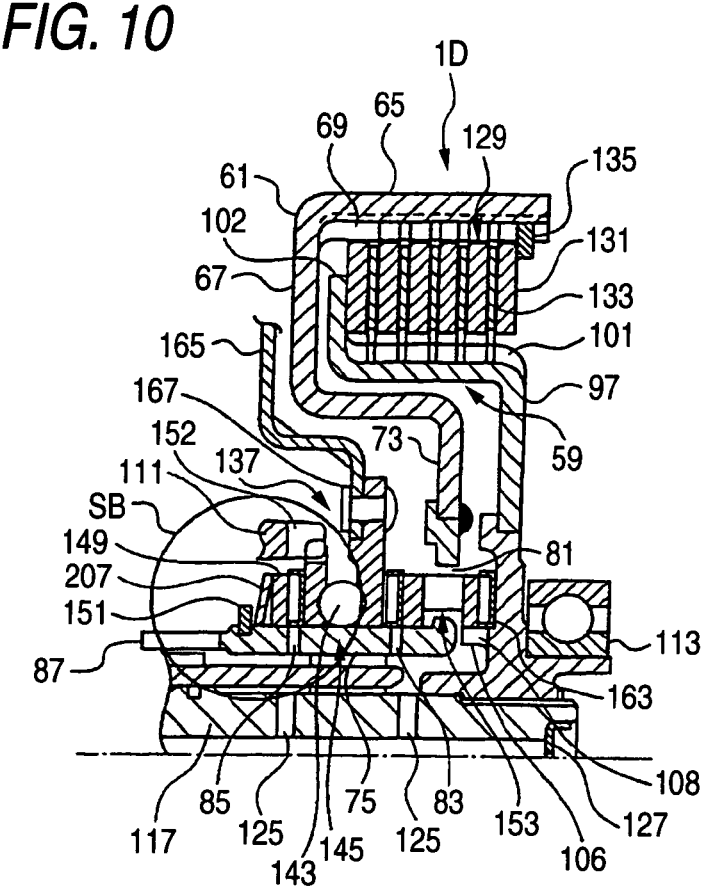
FIG. 10 is a cross-sectional view of a starter clutch according to a modified example of the second embodiment.
Figure 11:
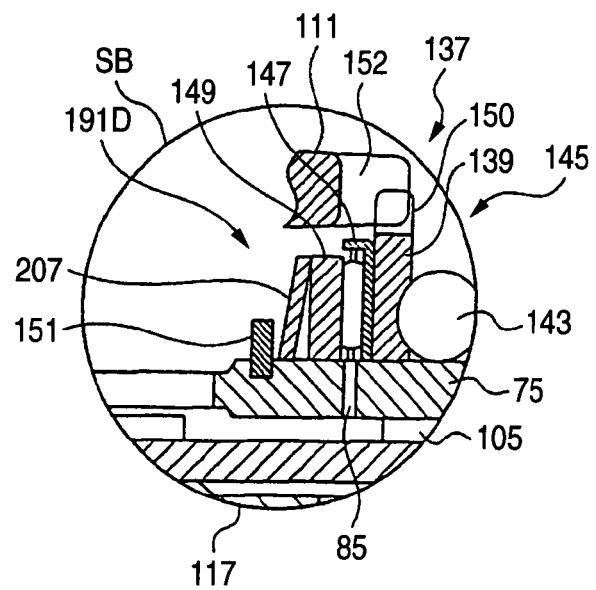
FIG. 11 is an enlarged cross-sectional view illustrating a portion according to the modified example of the second embodiment which is indicated by SB in FIG. 10.

FIGS. 10, 11 show an embodiment of a modified example of the second embodiment, wherein FIG. 10 is a cross-sectional view of a main part of a starter clutch 1D, and FIG. 11 is an enlarged cross-sectional view of a portion indicated by SB in FIG. 10.

A starter clutch 1D according to the embodiment is such that a damper mechanism 191D for damping the thrust produced when the inertial force on the motor 171 side acts on the pressurizing member 137 is provided between the pressurizing member 137 and a boss portion 75. Namely, in this embodiment, a coned disc spring 207 is interposed between a stopper ring 149 and a snap ring 151.

In this embodiment, in the event that the inertial force enters the pressurizing member 137 from the motor 171 side, whereby the cam mechanism 145 produces a large magnitude of thrust temporarily, the coned disc spring 207 receives the force from the member 139 via needle bearings 147 and the stopper ring 149. This force deflects the coned disc spring 207 between the stopper ring 149 and the snap ring 151 to thereby damp the thrust which is caused to rise temporarily. By this damping, the engagement of the frictional multi-plate clutch 129 by the thrust that is caused to rise temporarily is suppressed.

After the thrust by the inertial force on the motor 171 side is damped by the coned disc spring 207, the coned disc spring 207 bottoms on while being deflected, and the cam mechanism 145 smoothly produces a thrust as is driven by the motor 171 and the frictional multi-plate clutch 129 can be brought into engagement according to a current applied.

Consequently, also with this embodiment, as in the case of the previous embodiment, properties as shown in FIG. 9B can be obtained.

Third Embodiment

Figure 12:
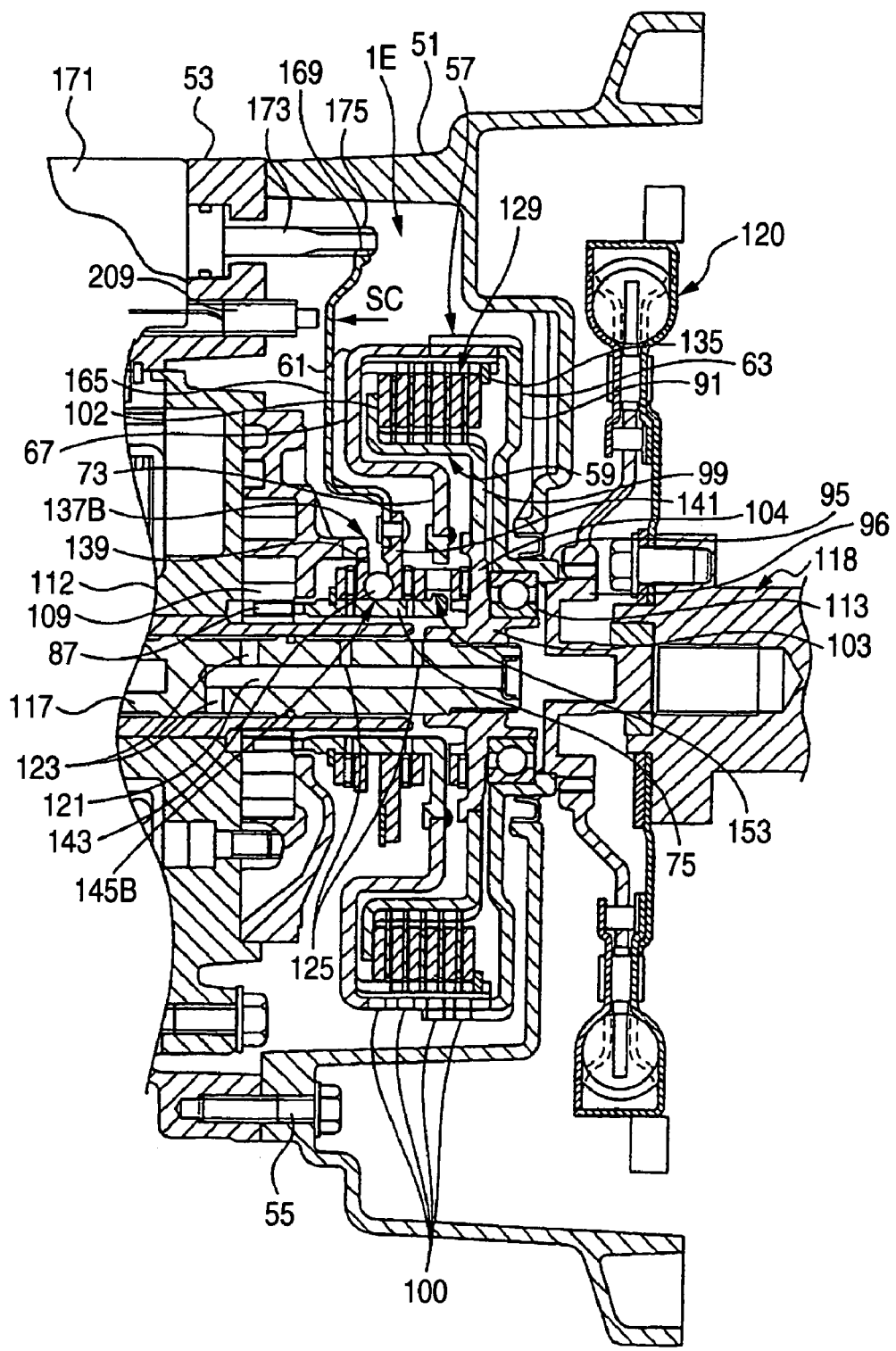
FIG. 12 is a cross-sectional view of a starter clutch and the periphery thereof according to a third embodiment of the invention.
Figure 14A:
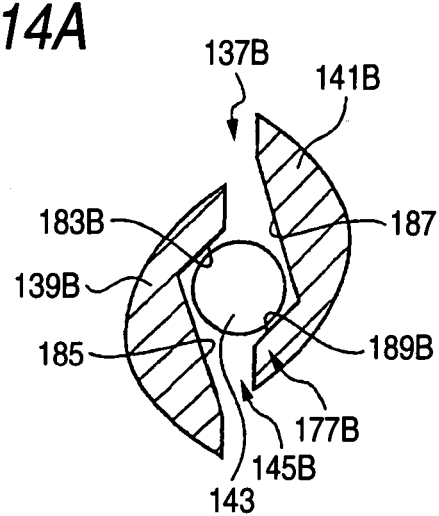
FIG. 14A is a deployed cross-sectional view of the pressurizing member according to the third embodiment in the large play state.
Figure 14B:
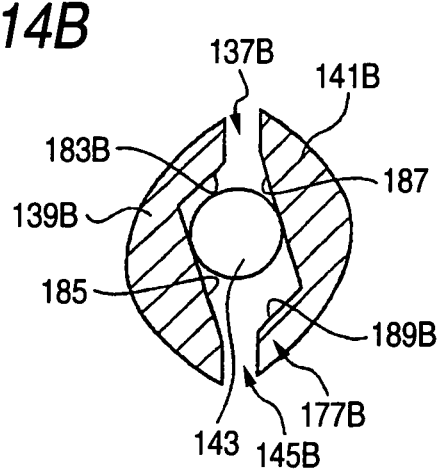
FIG. 14B is a deployed cross-sectional view of the pressurizing member in the intermediate play state.
Figure 14C:
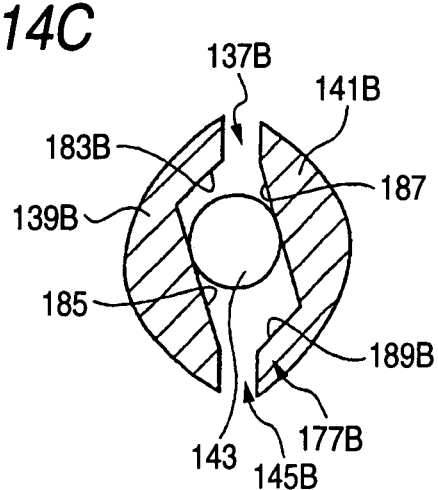
FIG. 14C is a deployed cross-sectional view of the pressurizing member in the small play state.
Figure 15:
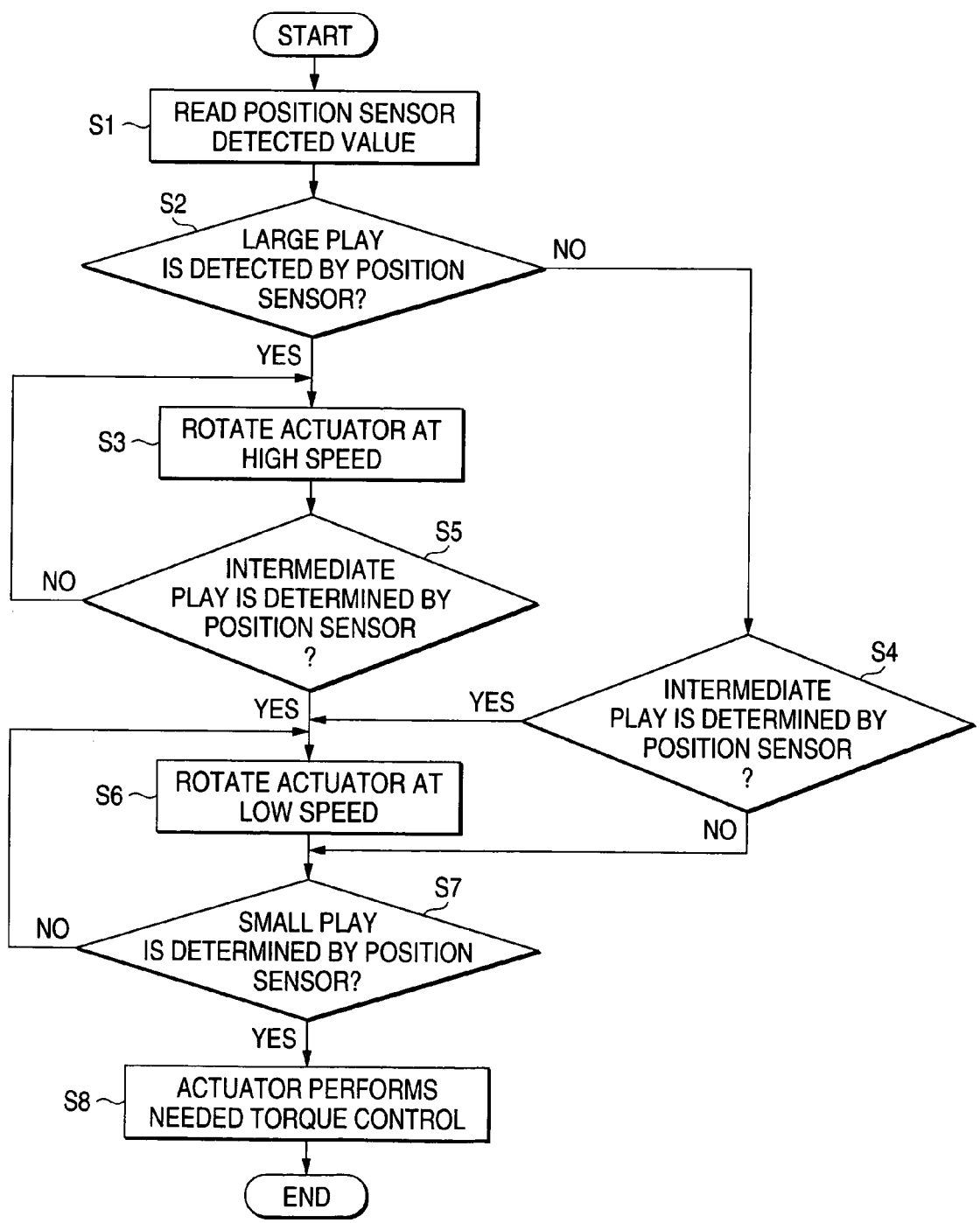
FIG. 15 is a flowchart according to the third embodiment.

FIGS. 12 to 15 shows a third embodiment of the invention, in which FIG. 12 is a cross-sectional view illustrating a starter clutch and the periphery thereof. FIG. 13A is a front view of a pressurizing member which is in a state where a large play exists with part of the pressurizing member being omitted, FIG. 13B is a front view of the pressurizing member which is in a state where an intermediate play exists with part of the pressurizing member being omitted, and FIG. 13C is a front view of the pressurizing member which is in a state where a small play exists with part of the pressurizing member being omitted. FIG. 14A is a deployed cross-sectional view of a main part of the pressurizing member which is in the state where the large play exists, FIG. 14B is a deployed cross-sectional view of the main part of the pressurizing member which is in the state where the intermediate play exists, and FIG. 14C is a deployed cross-sectional view of the main part of the pressurizing member which is in the state where the small play exists. FIG. 15 is a flowchart explaining the operation of the third embodiment. Note that the basic construction of the third embodiment is similar to that of the first embodiment, and hence like reference numerals are imparted to corresponding constituent portions of the third embodiment for the purpose of explanation thereof.

As has been described before, when the inertial force of the rotating constituent components in the motor 171 is applied to the pressurizing member 137 via the gear plate 165, the thrust produced in the cam mechanism is caused to rise temporarily largely.

Then, in a starter clutch E according to the embodiment, there is provided a control means for controlling a motor 171 such that the rotational driving of a pressurizing member 137 is made relatively fast when a play is being removed, whereas the rotational driving of the pressurizing member is made relatively slow after the removal of play is completed, so that the influence of the inertial force is suppressed.

Namely, as shown in FIG. 12, a position sensor 209 which makes up the control means is provided on a transmission case 53 side in such a manner as to confront a gear plate 165E.

As shown in FIG. 13A to FIG. 13C, for example, three marks 211, 213, 215 are provided on the gear plate 165E continuously along a rotating direction, the marks so provided making up part of the control means similarly. The mark 211 indicates a small play sensing point, the mark 213 indicates an intermediate play sensing point, and the mark 215 indicates a large play sensing point.

In FIG. 13A to FIG. 13C, while the marks 211, 213, 215 and the position sensor 209 are all shown on a side of the gear plate 165E which confronts the viewer as seen in a direction indicated by an arrow SC in FIG. 12, they are so shown as a matter of conveniences, and in actually, the position sensor 209 is disposed as shown in FIG. 12, and the marks 211, 213, 215 are provided on a side of the gear plate 165E which oppose the side where the position sensor 209 is provided.

A cam mechanism 145B of this embodiment makes use of the cam mechanism 145B of the embodiment shown in FIG. 6, and the cam mechanism 145B is also constructed so as to include a cancellation mechanism 177.

With the motor 171 being positioned at a neutral position, the position sensor 209 detects the mark 215 which is representative of the large play sensing point as shown in FIG. 13A. As this occurs, as shown in FIG. 14A, the cam mechanism 145B is in a state where a large play exists between cam surfaces 185, 187, 183B, 189B of the cam mechanism 145B and a ball 143.

When the gear plate 165E rotates to the position shown in FIG. 13B as the motor 171 is driven, the position sensor 209 detects the mark 213 which is representative of the intermediate play sensing point. As this occurs, as shown in FIG. 14B, in the cam mechanism 145, the cam surfaces 185, 187 approach the ball 143, whereby the play between the cam surfaces is reduced to the intermediate level.

When the gear plate 165E rotates further as the motor 171 rotates further, as shown in FIG. 13C, the position sensor 209 detects the mark 211 which is representative of the small play sensing point. As this occurs, as shown in FIG. 14C, the cam surfaces of the cam mechanism 145B are brought into abutment with the ball 143, and the cam mechanism 145B starts to produce a thrust. A member 141 moves by virtue of the thrust so produced, resulting in a state where a gap between an outer plate 131 and an inner plate 133 which are on a frictional multi-plate clutch 129 side is almost removed.

Thus, the large play state shown in FIG. 14A, the intermediate play state shown in FIG. 14A and the small play state shown in FIG. 14C are detected by the position sensor 209, detected values of the position sensor 209 are made to enter a controller constituting a control means, whereby the rotational speed of the motor 171 is controlled.

Namely, the motor 171 is caused to rotate at high speeds from the large play state shown in FIG. 14A to the intermediate play state shown in FIG. 14B. The motor 171 is caused to rotate at low speeds from the intermediate play state shown in FIG. 14B to the small play state shown in FIG. 14C. A needed torque control at the frictional multi-plate clutch 129 by the motor 171 is performed after the small play state shown in FIG. 14C has been attained.

To explain further using a flowchart shown in FIG. 15, in step S1, a process of "reading a value detected by the position sensor" is executed, and any of detected values of the marks 211, 213, 215 of the position sensor 209 is read in by the controller, and the flow proceeds to step S2.

In step S2, a determination of "whether the position sensor determines the large play" is executed. In step S2, when the position sensor 209 detects the mark 215, the state shown in FIG. 14A results, and the existence of large play is determined (YES), the flow proceeding to step S3. In step S2, when the position sensor 209 detects any other marks than the mark 215, either the state shown in 14B or the state shown in 14C results, and hence the play is determined not to be large (NO), the flow proceeding to step S4.

In step S3, a process of "causing the actuator to rotate at high speeds" is executed. In this process, the motor 171 is caused to rotate at high speeds and is driven to from the large play state shown in FIGS. 13A, 14A to the intermediate play state shown in FIGS. 13B, 14B. In this driving state, the flow proceeds to step S5, where a determination of "whether the position sensor determines as the intermediate play existing" is executed.

In step S5, when the intermediate play is determined to exist, since the state shown in FIGS. 13B, 14B is reached as a result of controlling the motor 171 to rotate at high speeds, the flow proceeds to step S6.

In step S5, when the intermediate play is not determined to exist while controlling the motor 171 to rotate at high speeds, since this means that there is occurring an intermediate situation before the state shown in FIG. 13B, 14B is reached from the state shown in FIG. 13A, 14A, the flow returns to step S3, where the motor 171 is caused to continue to rotate at high speeds.

In step S6, a process of "causing the actuator to rotate at low speeds" is executed. In this process, the motor 171 is caused to rotate at low speeds, and the flow moves to step S7.

In step S7, a process of "determining whether the position sensor determines the existence of small play existing" is executed. In step S7, when the small play is determined to exist (YES), since the state in FIGS. 13C, 14C has been reached from the state shown in FIGS. 13C, 14C as a result of controlling the motor 171 to run at low speeds, the flow proceeds to step S8. In step S7, when the small play is not determined to exist, since there is occurring an intermediate situation before the state shown in FIGS. 13C, 14C is reached from the state shown in FIGS. 13B, 14B, the flow returns to step S6, where the motor 171 is caused to rotate at low speeds.

In step S8, a process of "the actuator carries out a needed torque control" is executed. In this step S8, the motor 171 is controlled so as to obtain a transmitted torque needed by the frictional multi-plate clutch 129 from the state where the play at the cam mechanism 145B has been removed.

In step S4, a process of "determining whether the position sensor determines the existence of intermediate play" is executed. In step S4, when the intermediate play is determined to exist (YES), since it means that the state shown in FIGS. 13B, 14B results, the flow proceeds to step S6, the motor 171 is controlled to rotate at low speeds as has been described above.

In step S4, when the intermediate play is not determined to exist, since neither the state shown in FIGS. 13A, 14A nor the state shown in FIGS. 13B, 14B exists, the flow proceeds to step S7, where the small play is determined to exist, and the flow proceeds to step S8, where a needed torque control is implemented, or the flow proceeds to step S6, where the motor 171 is controlled to rotate at low speeds.

By carrying out the controls as has been described above, the motor 171 is caused to rotate at high speeds from the large play state shown in FIGS. 13A, 14A to the intermediate play state shown in FIGS. 13B, 14B, whereby the large play existing in the pressurizing member 137B can be removed.

The motor 171 is caused to rotate at low speeds when shifting from the intermediate play state shown in FIGS. 13C, 14C to the small state shown in FIGS. 13C, 14C, whereby when the play at the cam mechanism 145B is removed, the application. of the inertial force on the motor 171 side to the cam mechanism 145B can be suppressed.

Namely, the removal of play at the pressurizing member 137B is implemented quickly by the relatively fast rotational driving of the motor 171 from the neutral position where the large play exists, and when the play is removed to thereby produce a thrust, the influence of the inertial force on the motor 171 side to the pressurizing member 137B can be suppressed by the relatively low rotational driving of the motor 171. Due to this, the temporary rise in frictional engaging force at the frictional multi-plate clutch 129 by the influence of the inertial force of the motor 171 can be suppressed, thereby making it possible to implement a smooth engagement or disengagement of transmission of torque with little shock.

Since the removal of play at the pressurizing member 137B can be implemented quickly by the relatively fast rotational driving of the motor 171, the play at the cam mechanism 145B is set large, whereby the engagement responsiveness can be secured even if the gap at the frictional multi-plate clutch 129 is made large as shown in FIGS. 13A, 14A, and the engagement of the frictional multi-plate clutch 129 by the drag torque as has been described above can be suppressed in an ensured fashion.

Note that also in this embodiment, since the cancellation portion 177B is provided, as in the case shown in FIG. 6, the production of a thrust by the inertial force can be reduced also in this cancellation portion 177B, thereby making it possible to implement a smooth torque engagement or disengagement of transmission of torque with little shock.

In addition, with the aforesaid position sensor being not used, the motor 171 may be replaced by a stepping motor for the actuator, whereby the same function and advantage can be provided through control while grasping the position. In addition, in the event the amount of play changes as the wear of the frictional multi-plate clutch 129 progresses in association with the use of the frictional multi-plate clutch 129 for a long period of time, an increment in play can be detected from an increase in the number of rotational speed of the motor 171, whereby timings of high-speed rotation and low-speed rotation of the actuator can be changed through feedback control.

Fourth Embodiment

Figure 16:
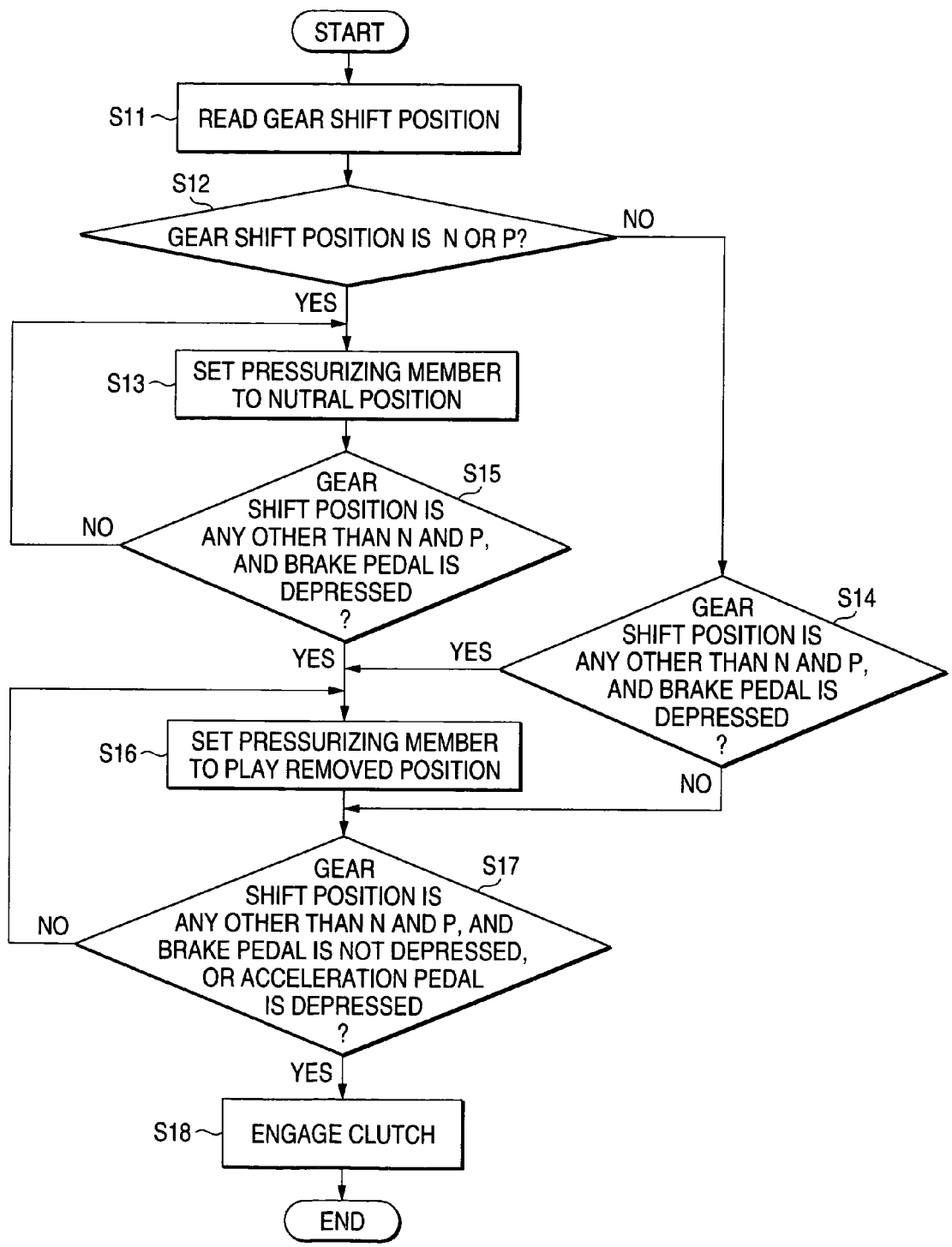
FIG. 16 is a flowchart at the start of vehicle according to a fourth embodiment of the invention.

FIG. 16 is a flowchart at the time of start of a vehicle according to a fourth embodiment. The starter clutches 1, 1C, 1D, 1E in the first to third embodiments can be used as the torque transmission apparatus. A pressurizing member is constructed in the same way in which, for example, the pressurizing member shown in FIG. 14 is constructed. As to reference numerals for components, the first to third embodiments are referred to.

In the starter clutches 1, 1C, 1D, 1E, in order to reduce the drag torque at the frictional multi-plate clutch 129, the gap between the outer plate 131 and the inner plate 133 needs to be set large.

However, in the event that the gap between the outer plate 131 and the inner plate 133 is set large, the play in the rotating direction at the pressurizing member 137, 137B is increased. Due to this, when the frictional multi-plate clutch 129 is engaged so as to transmit torque, firstly, the large play has to be removed, and this causes a drawback that the improvement in responsiveness to the engagement of the frictional multi-plate clutch 129 relative to the current control of the motor 171 is restricted.

Then, in the starter clutches 1, 1C, 1D, 1E of the embodiments, there is provided a control means for controlling the motor 171 such that the pressurizing member 137, 137B is caused to stand by at the neutral position where a play exists and a play removal position where there is no or little play depending upon the conditions of the vehicle.

The condition of the automotive vehicle is determined in this embodiment by detecting the gear shift position of the transmission 5 to thereby determine whether the automotive vehicle is being parked, is running or in running with a brake pedal being depressed.

The control means is made up of an inhibitor switch for detecting the gear shift position of the transmission 5 and a controller for controlling the motor 171 when a detection signal of the inhibitor switch is inputted thereinto.

When the control of the motor 171 is executed, in step S11 in FIG. 16, a process of "reading in a gear shift position" is executed. In this step S11, the gear shift position of the transmission 5 detected by the inhibitor switch is read in, the flow proceeding to step S12.

In step S12, a determination of "whether the gear shift position is N or P" is executed. In the event that the gear shift position so read in is determined to be the neutral N position or the parking P position (YES) in the controller, since the automotive vehicle is in a parked state, then the flow proceeds to step S13. In the event that the gear shift position is determined to be neither N position nor P position (NO), the vehicle is determined to be in a running state, and the flow proceeds to step S14.

In the step S13, a process of "setting the pressurizing member to the neutral position" is executed. In this process, as shown in FIG. 14A, the motor 171 is controlled so as to hold the neutral position where the large play exists at the cam mechanism 145B of the pressurizing member 137B, and the flow proceeds to step S15.

In step S15, a determination of "whether the gear shift position is in any other gear shift position than N position and P position, and whether the brake pedal is depressed" is executed. In the event that the gear shift position is determined to be in any other position than N position and P position, and the brake pedal is determined to be depressed (YES), it is understood that while the vehicle is running, the brake pedal is being depressed, and the flow proceeds to step S16. In the event that the determination is made otherwise (NO), the vehicle is determined to be still in the parked state, then the flow returns to step S13.

In step S16, a process of "setting the pressurizing member to the play removed position" is executed. In this process, as shown in FIG. 14B, the removal of play at the pressurizing member 137, 137B is implemented, and the motor 171 is controlled such that the pressurizing member is located at the play removed position where there exists little play. This is because, when the brakes are applied while driving, torque transmitted by the frictional multi-plate clutch 129 is caused to rise with good responsiveness from the play removed state of the pressurizing member 137, 137B next time an accelerator pedal is depressed. As this occurs, the pressurizing member 137, 137B is made to stand by, for example, in the state shown in FIG. 14B, and the flow proceeds to the following step S17.

In step S17, a determination of "whether the gear shift position is any other gear shift position than No r P with the brake pedal being not depressed or with the acceleration being ON" is executed. In the event that the gear shift position of the transmission 5 is at any other gear shift position than N or P position, and the brake pedal is not depressed or the acceleration is ON (YES), it is understood that the vehicle is running with the brake pedal being depressed or in the middle of acceleration with the accelerator pedal being ON. As this occurs, since the frictional multi-plate 129 needs to be engaged, the flow proceeds to step S18, and on the contrary, in case it is determined otherwise (NO), the flow returns to step S16.

In step S18, a process of "bringing the clutch into engagement" is executed, and the motor 171 is controlled to rotate at low speeds from the state shown in FIG. 14B, for example, to the state shown in FIG. 14C where there is little torque, and by further rotation of the motor 171, the frictional multi-plate clutch 129 is controlled to be engaged in order to obtain a predetermined torque to be transmitted thereby.

In step S14, a determination of "whether the gear shift position is any other one than N or P, and whether the brake pedal is being depressed" is executed. In the event that the gear shift position of the transmission 5 is in any other gear shift other than N position or P position, with the brake pedal being depressed, namely, in the event that the brake pedal is depressed while running (YES), the flow proceeds to step S16 as has been described above where the pressurizing member 137, 137B are made to stand by at the play removed position as shown in FIG. 14B.

In the event that the determination in step S14 determines that the gear shift position is at any other shift position than N position or P position with the brake pedal being not depressed, namely, in the event that the brake pedal is not depressed while running (NO), the flow proceeds to step S17 as has been described before, where a similar control to the previous one is executed.

In the event that the gear shift position of the transmission 5 is N position or P position with the automotive vehicle being in the parked state as a result of the control, by making the pressurizing member 137, 137B to stand by at the neutral position, the play thereof is held large as shown in FIG. 14A. Consequently, the drag torque in the frictional multi-plate clutch 129 can be suppressed, thereby making it possible to implement an accurate engagement or disengagement of torque.

Namely, power loss can be reduced, whereas the fuel consumption can be improved.

In the event that the brake pedal is depressed while the automotive vehicle is running, by making the pressurizing member to stand by at the intermediate play state as shown in FIG. 14B, the frictional multi-plate clutch 129 is allowed to implement an engaging operation without any delay when the depression of the brake pedal is released, and further when the accelerator pedal is depressed, thereby making it possible to improve the responsiveness.

In the event that there occurs no depression of the brake pedal while the automotive vehicle is running, or further in the event that the accelerator pedal is depressed, by controlling the frictional multi-plate clutch 129 so as to be brought into engagement, an ensured engagement of the transmission of torque can be implemented.

Thus, with the starter clutches 1, 1C, 1D, 1E according to the embodiment, since the motor 171 is controlled such that the pressurizing member 137, 137B is made to stand by at the neutral position where the play exists and the play removed state where there exists little play according to the condition of the automotive vehicle, the frictional multi-plate clutch 129 can be brought into frictional engagement quickly according to the condition of the automotive vehicle, so that the transmission of torque can be implemented.

In addition, by making the pressurizing member to stand by at the neutral position where there exists the play, the gap at the frictional multi-plate clutch 129 can be secured accurately, whereby the engagement of the frictional multi-plate clutch 129 by the drag torque can be suppressed, thereby making it possible to implement an accurate disengagement of the transmission of torque.

Note that in step S16, by making the pressurizing member 137, 137B to sand by at the state as shown in FIG. 14C, for example, the pressurizing member can also be constructed so as to stand by at the state where there exists little play.

Figure 17:
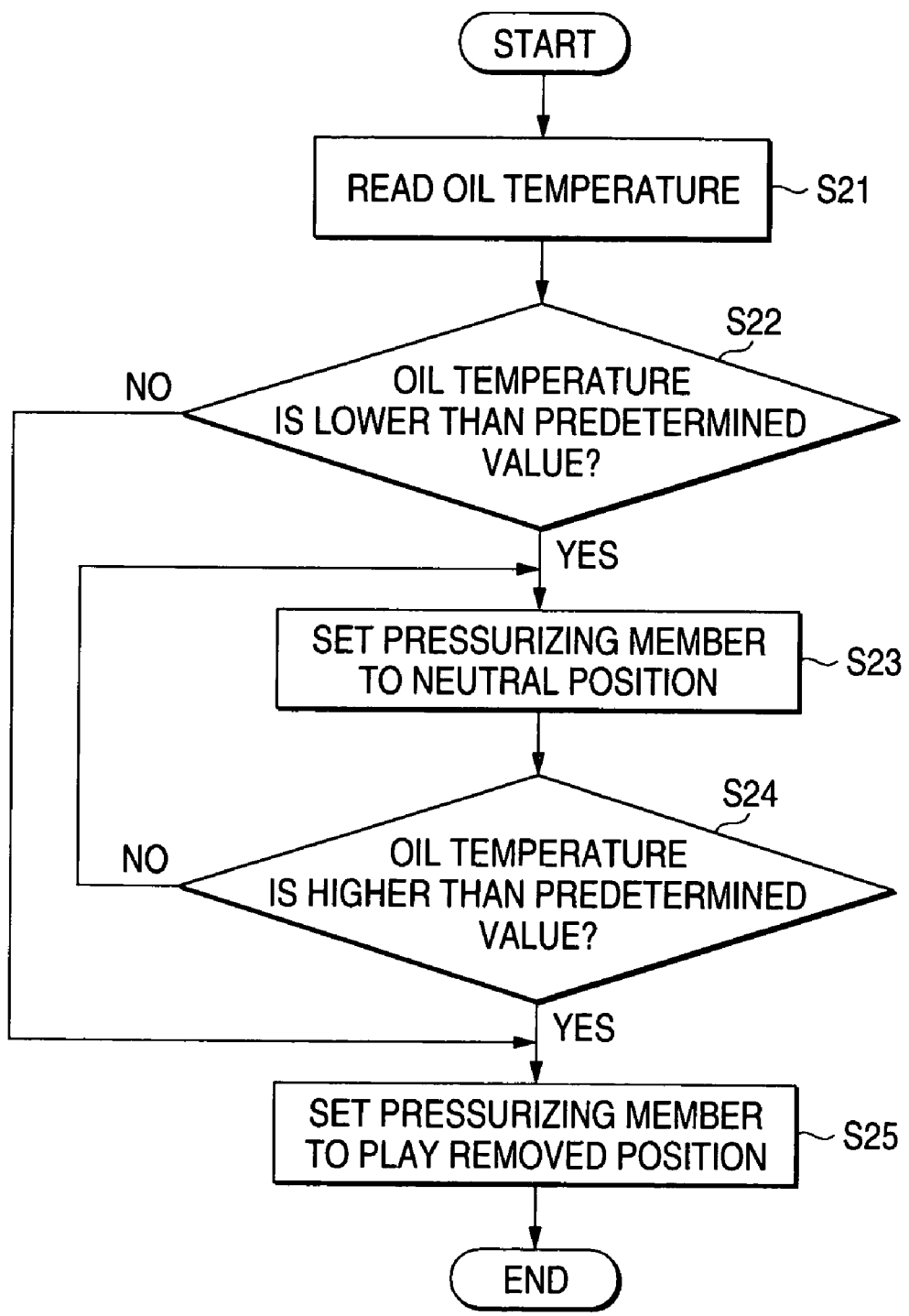
FIG. 17 is a flowchart of a modified example of the fourth embodiment.

FIG. 17 is a flowchart illustrating a modified example of the fourth embodiment.

The drag torque of the frictional multi-plate clutch 129 is influenced by the viscosity of lubricating oil. The viscosity of lubricating oil changes depending on the conditions of the automotive vehicle, that is, whether or not the condition thereof is one resulting immediately after the start of the automotive vehicle. Consequently, the temperature of lubricating oil is detected as the condition of the automotive vehicle, and the control is implemented based on the temperature so detected, so that the drag torque of the frictional multi-plate clutch 129 is suppressed.

Then, in this embodiment, as a control means, a controller is provided which is made up of an oil temperature sensor for detecting the temperature of oil within the transmission 5 or the casing 51 and a controller for controlling the motor 171 when a detection value of the oil temperature sensor is inputted thereinto.

When the flowchart shown in FIG. 17 is executed, in step S21, a process of "reading in an oil temperature" is executed, and a detection value of the temperature of oil within the transmission 5 or the casing 51 is read in by the oil temperature sensor, then the flow proceeding to step S22.

In step S22, a determination of "whether the oil temperature is lower than a set value" is executed. If the oil temperature is lower than the set value (YES), since the viscosity of lubricating oil is high and hence the clutch tends to be engaged by the drag torque, then the flow proceeds to step S23, and if it determined otherwise, then the flow proceeds to step S25.

In step S23, a process of "setting the pressurizing member to the neutral position" is executed. In this process, a control similar to that implemented in step S13 in FIG. 16 is implemented. Namely, the motor 171 is controlled such that the pressurizing member 137, 137B stands by at the neutral position where the large play exists at the cam mechanism 145B of the pressurizing member 137, 137B, and then the flow proceeds to step S24.

In step S24, a determination of "whether the oil temperature is high than the set value" is executed. In the event that the oil temperature is higher than the set value (YES), it is understood that a certain period of time has elapsed since the automotive vehicle was started, and hence that the viscosity of lubricating oil is low, there existing no or little drag torque at the frictional multi-plate clutch 129, and the flow proceeds to step S25, and if it determined otherwise, the flow returns to step S23.

In step S25, a similar control to that implemented in step S16 shown in FIG. 16 is implemented. Namely, as shown in FIG. 14B, the play at the pressurizing member 137, 137B is removed, and the motor 171 is controlled to rotate such that the pressurizing member 137, 137B stands by at the play removed position where there exists small drag.

In the event that the oil within the transmission 5 and the casing 51 is supplied to the starter clutch 1, 1C, 1D, 1E side as lubricating oil when the temperature thereof is low, due to the viscosity thereof being high, there is a possibility that a large magnitude of drag torque may be produced at the frictional multi-plate clutch 129. Consequently, in the embodiment shown in FIG. 17, the pressurizing member 137, 137B is made to stand by at the neutral position where there exists the large play as shown in FIG. 14A, whereby the drag torque of the frictional multi-plate clutch 129 can be suppressed.

In addition, when the oil temperature increases, and the viscosity of the oil decreases, since the drag torque decreases or there exists almost no drag torque, the pressurizing member 137, 137B is made to stand by at the intermediate play state as shown in FIG. 14B, while the drag torque at the frictional multi-plate clutch 129 is being suppressed, the responsiveness of engagement of the frictional multi-plate clutch 129 can be increased.

Note that as with the step S16, in step S25, by making the pressurizing member 137, 137B to standby by in the state shown in FIG. 41, for example, whereby the pressurizing member 137, 137B is also constructed to stand by in the state where there exists no or little play.

Fifth Embodiment

Figure 18:
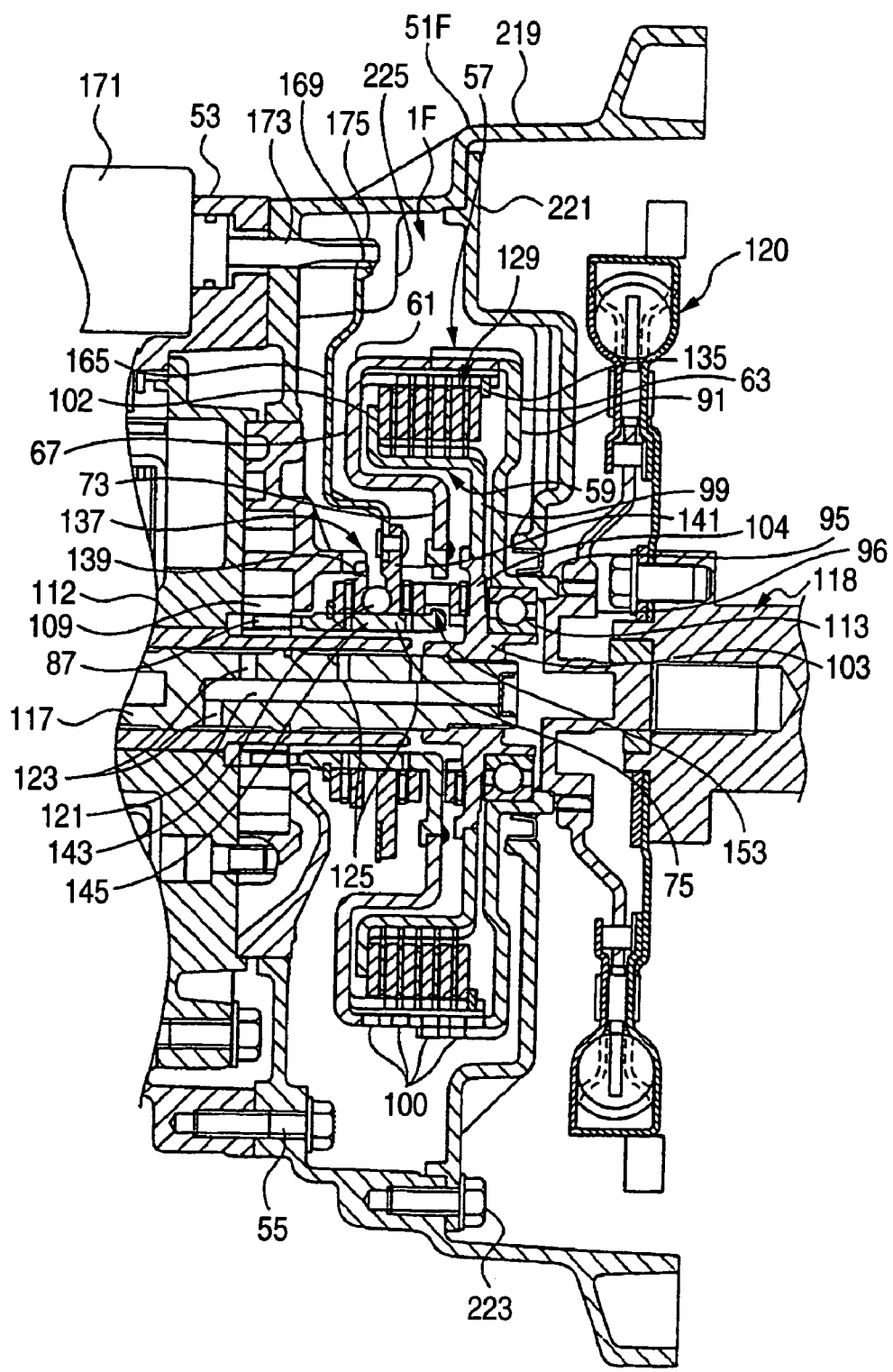
FIG. 18 is a cross-sectional view illustrating a starter clutch and the periphery thereof according to a fifth embodiment of the invention.
Figure 19:
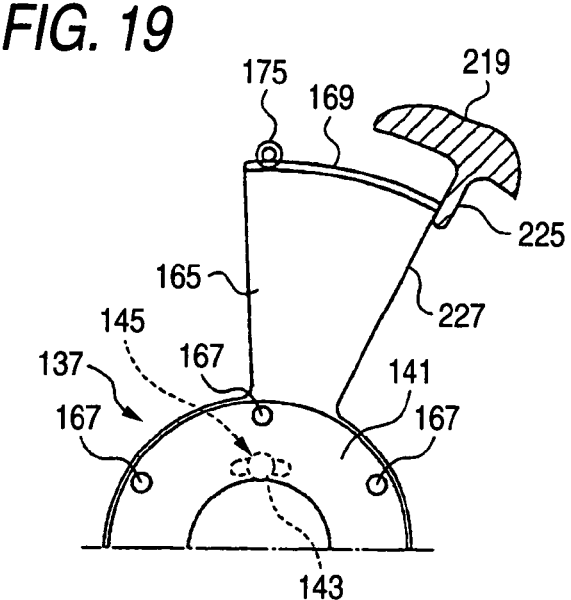
FIG. 19 is a front view, with part being omitted, illustrating a relationship between a pressurizing member showing a positioning state of one of members and a positioning wall according to the fifth embodiment.
Figure 20:
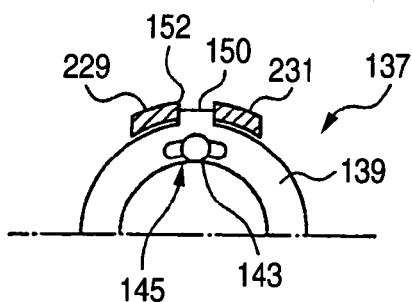
FIG. 20 is a front view, with part being omitted, illustrating a relationship between an engagement portion showing a positioning state of the other member and a locking portion according to the fifth embodiment.
Figure 21A:
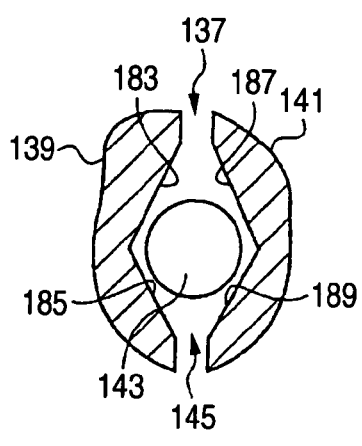
FIG. 21A is a deployed cross-sectional view of a main part illustrating a neutral position of the pressurizing member according to the fifth embodiment.
Figure 21B:
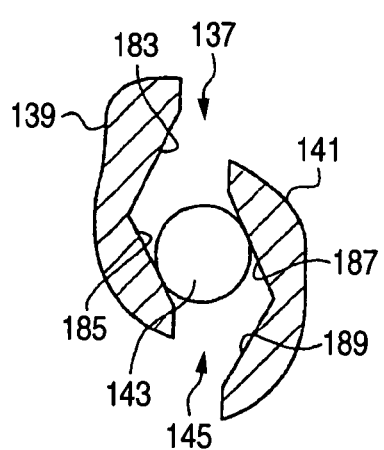
FIG. 21B is a deployed cross-sectional view of a main part illustrating a thrust producing position of the pressurizing member according to the fifth embodiment.

FIGS. 18 to 21B show a fifth embodiment of the invention, in which FIG. 18 is a cross-sectional view of a starter clutch 1F and the periphery thereof. FIG. 19 is a front view illustrating a relationship between a pressurizing member and a positioning wall which shows a positioning state of one of members of the pressurizing member with part being omitted. FIG. 20 is a front view illustrating a relationship between an engagement portion and a locking portion which illustrates a positioning state of the other member with part being omitted. FIG. 21A and FIG. 21B show the position of the pressurizing member, in which FIG. 21A is a deployed cross-sectional view of a main part which illustrates a neutral position of the pressurizing member, and FIG. 21B is a deployed cross-sectional of the main part which illustrates a thrust producing position of the pressurizing member. Note that the basic construction thereof is similar to that of the first embodiment, and like reference numerals are imparted to corresponding portions for explanation.

In incorporating the starter clutch 1, 1C, 1D, 1E in the casing 51, since the frictional multi-plate clutch 29 is installed while being positioned in the neutral position where there is a gap, the installation has to be implemented with the cam mechanism 145, 145B of the pressurizing member 137, 137B being positioned at the neutral position.

However, in implementing such an installation, a considerable difficulty is accompanied by an attempt to implement of the installation while viewing the neutral position of the pressurizing member 137, 137B.

Then, in a starter clutch 1F according to this embodiment, a positioning portion is provided on a casing 51 which constitutes a fixed side for enabling an assembly by positioning members 139, 141 of a pressurizing member 137 in a rotating direction, and the members 139, 141 are positioned by the positioning portion, so that the neutral position of the pressurizing member 137 is held.

Namely, with the starter clutch 1F according to the embodiment, as shown in FIGS. 18, 19, a casing 51F is made up of a main body portion 219 and a lid portion 221, and the lid portion 221 is fixedly fastened to the main body portion 219 with bolts 223 at a plurality of locations.

A positioning wall 225 is provided as the positioning portion on a main body portion 219 of the casing 51F in such a manner as to protrude therefrom. The positioning wall 225 abuts with an edge portion 227 of a gear plate 165 to thereby position the gear plate 165, whereby the member 141 of the pressurizing member 137 which is made an integral part of the gear plate 165 is positioned.

In addition, as shown in FIG. 20, a locking portion 152 for locking an engagement portion 150 of the member 139 of the pressurizing member 137 in a rotating direction is formed between protruding portions 229, 231 which are provided on the pump housing 111 side in such a manner as to protrude therefrom.

Then, at the time of installation, the pressurizing member is installed in the main body portion 219 with the lid 221 being removed, and the engagement portion on the member 139 is locked in the rotating direction on the locking portion 152 on the pump housing 111 side. At the same time, the gear plate 165 is brought into abutment with the positioning wall 225 of the main body portion 219 as shown in FIG. 19, whereby the member 141 of the pressurizing member 137 is positioned in the rotating direction.

In this state, as shown in FIG. 21A, the pressurizing member 137 can be set to a neutral position where a play at the cam mechanism 145 in the pressurizing member 137 is large.

Namely, the positional relationship in the rotating direction of the members 139, 141 of the pressurizing member 137 is positioned by the positioning wall 225, the engagement portion 150 and the locking portion 152, whereby at the time of installing the starter clutch 1F, the pressurizing member 137 can automatically be held at the neutral position as shown in FIG. 21A, thereby making it possible to enable the installation with extreme ease.

Then, by controlling the rotation of the motor 171, relative rotation is made to occur between the members 139, 141 from the neutral position of the pressurizing member by controlling the rotation of the rotor 171, and as shown in FIG. 21C, the ball 143 rides on the cam surfaces 185, 187, whereby a thrust can be produced.

Consequently, using the neutral position accurately determined as a reference, by controlling rotationally the motor 171, the engagement and disengagement of the frictional multi-plate clutch 129 can be implemented accurately, whereby an accurate engagement or disengagement of the transmission of torque can be implemented.

Note that the embodiment can equally be applied to the starter clutches 1, 1C, 1D, 1E.

Sixth Embodiment

Figure 22:
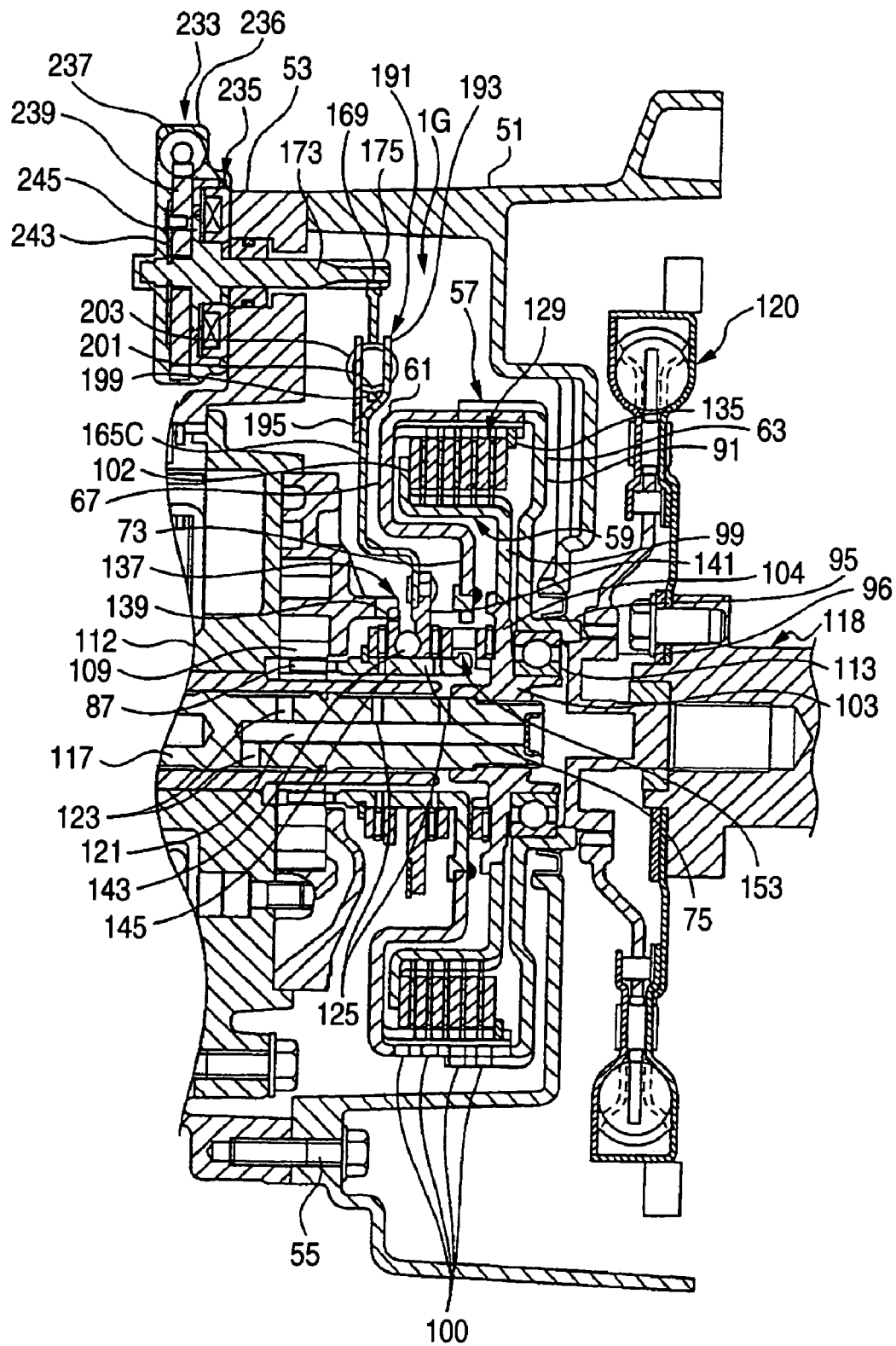
FIG. 22 is a cross-sectional view of a starter clutch and the periphery thereof according to a sixth embodiment of the invention.
Figure 23:
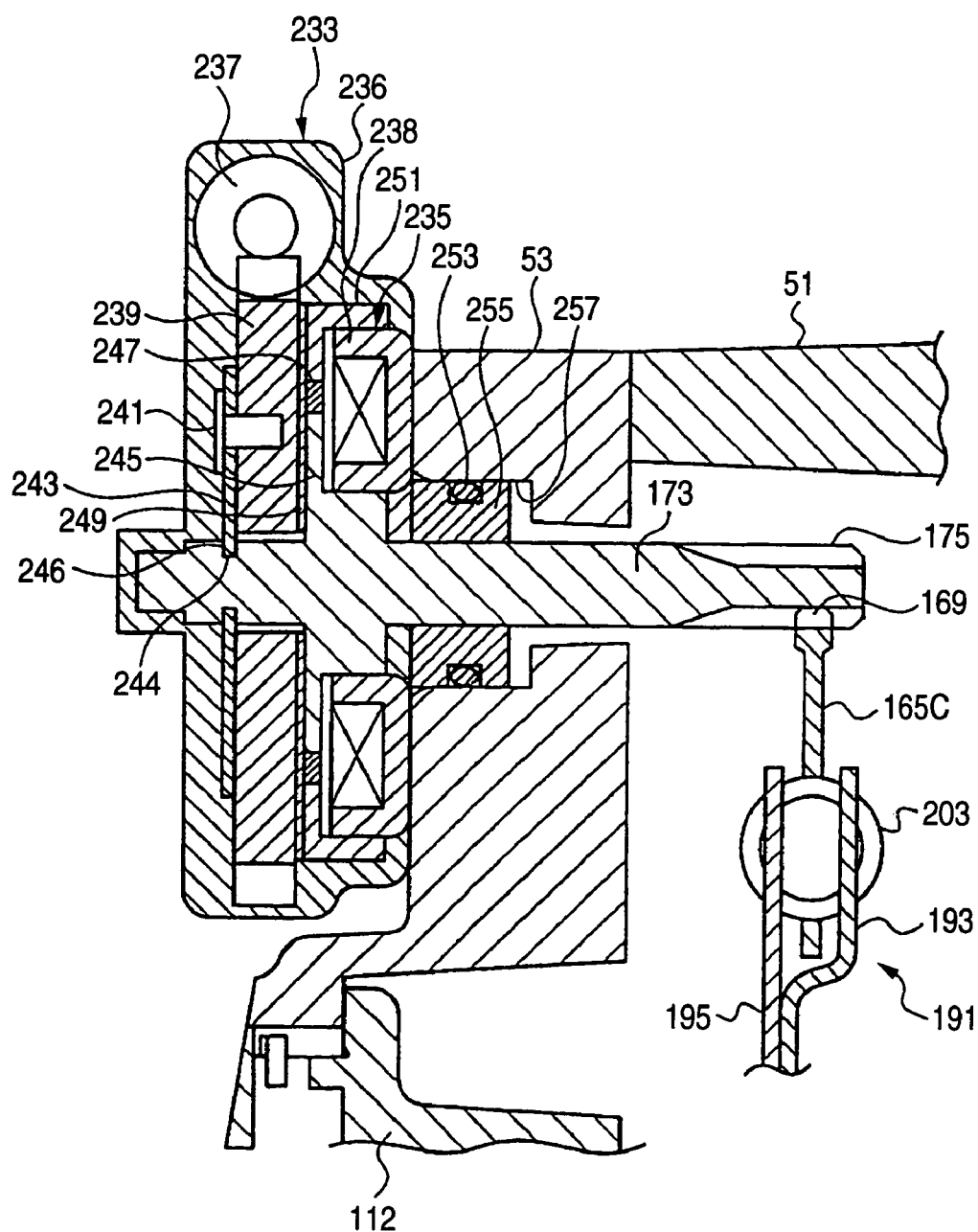
FIG. 23 is an enlarged cross-sectional view of a main part of the starter clutch according to the sixth embodiment of the invention.
Figure 24:
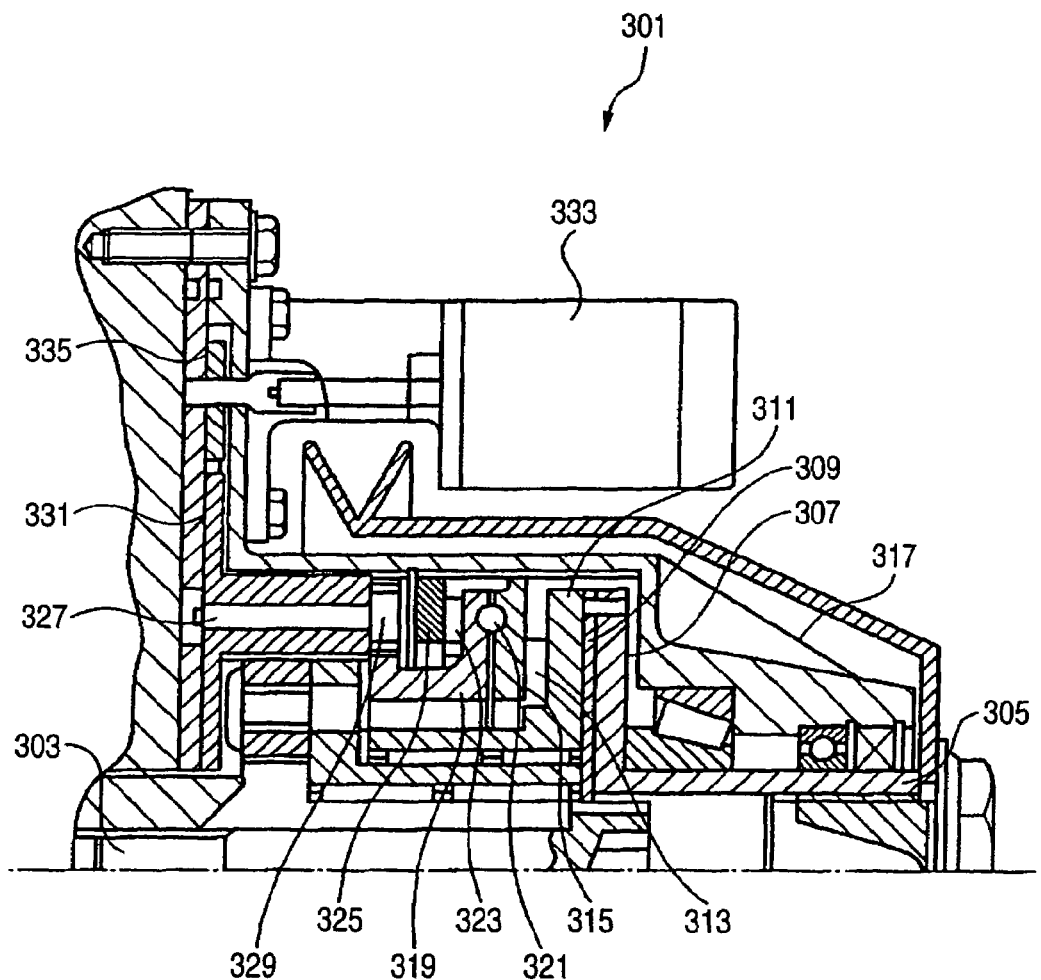
FIG. 24 is a cross-sectional view, with part being omitted, of a related torque transmission apparatus.

FIGS. 22, 23 show a sixth embodiment of the invention, in which FIG. 22 is a cross-sectional view of a starter clutch 1G and the periphery thereof, and FIG. 23 is an enlarged cross-sectional view of a main part of the starter clutch. Note that the basic construction of the starter clutch 1G is similar to that of the second embodiment shown in FIG. 7, and like reference numerals are given to corresponding constituent portions for description thereof.

In the starter clutches 1, 1C, 1D, 1E, 1F, power from the rotating drive shaft 173 is largely reduced in speed via the gears 175, 169, and the gear plate 165, 165C is driven to rotate, whereby the member 141, 141B of the pressurizing member 137, 137B is driven to rotate, and the thrust is produced by the cam mechanism 145, 145B, thereby making it possible to control the engagement of the frictional multi-plate clutch 129. As this occurs, by the aforesaid speed reduction, the engagement of the frictional multi-plate clutch 129 can be controlled in an ensured fashion using the small motor 171.

When releasing the engagement of the frictional multi-plate clutch 129, however, in the event that the pressurizing member 137, 137B is operated for release of the engagement of the frictional multi-plate clutch 129 through interlocking connections between the respective portions by reversing the motor 171, due to there being the aforesaid reduction in speed, a delay in responding to the engagement releasing operations of the frictional multi-plate clutch 129 tends to be called for easily. Due to this, there is caused further a difficulty in implementing a larger reduction in speed in order to attempt to make the motor 171 smaller in size.

Then, in a starter clutch 1G according to this embodiment, an electromagnetic clutch 235 is provided as a rotation coupling member between a rotational actuator 233 and a pressurizing member 137. In addition, there is provided a controller as the control means for controlling the pressurizing member 137 such that, when the pressurizing member 137 is driven as the rotational actuator is driven to rotate to thereby produce a thrust, the electromagnetic clutch 235 is put in a rotation engaging state, whereas when the thrust is released, the electromagnetic clutch 235 is put in the rotation disengaging state.

In this embodiment, the electromagnetic roller 235 includes an electromagnet 238 attached to an actuator housing 236 of a rotational actuator 233. The rotational actuator 233 includes a worm gear 237 which is driven to rotate forwards and backwards by the motor, a worm wheel 239 which meshes the worm gear 237, and a worm wheel 239. Consequently, a large reduction in speed is implemented between the worm gear 237 and the worm wheel 239.

A plate 243 is fastened and fixed the worm wheel 239 with a machine screw 241. An inner circumferential edge 244 of the plate 243 is fittingly supported in a circumferential groove 246 provided an end portion of a rotating drive shaft 173, whereby the worm wheel 239 is supported on the rotating drive shaft 173 side for free relative rotation. The plate 243 is constructed flexibly, and the worm wheel 239 is constructed so as to move slightly towards the electromagnet 238 side while the worm wheel 239 continues to mesh with the worm gear 237.

A flange portion 245 is provided on the rotating drive shaft 173. Non-magnetic material portions 247 are provided on the flange portion 245 continuously circumferentially or at predetermined intervals in a circumferential direction. A frictional clutch plate 249 is interposed between opposing surfaces of the flange portion 245 and the worm wheel 239 as an actuator frictional engagement portion having a predetermined friction coefficient. The frictional clutch plate 249 can also be omitted, and the opposing surfaces of the flange portion 245 and the worm wheel 239 are formed so as to have predetermined friction coefficients, respectively.

Consequently, in this embodiment, the electromagnet 238, the worm wheel 239, the flange portion 245 and the frictional clutch plate 249 constitute the electromagnetic clutch 235.

A collar portion 251 is provided on outer circumferential side of the flange portion 245. The collar portion 251 is interposed between the electromagnet 238 and an actuator housing 236 and is rotationally guided towards the actuator housing 236 side.

A fitting portion 255 is provided on the actuator housing 236 in such a manner as to protrude therefrom, and the rotating drive shaft 173 passes through the fitting portion 255. A seal 253 such as an O ring is provided in the fitting portion 255. The fitting portion 255 is fittingly held in a fitting recessed portion on a transmission case 53 side.

Then, when the energization of the electromagnet 238 is controlled by the controller, a magnetic field is formed between the electromagnet 238 and the worm wheel 239 from the electromagnet 238 through the flange portion 245 on the rotating drive shaft 173 side. The worm wheel 239 and the flange portion 245 of the rotating drive shaft 173 are drawn to the electromagnet 238 side.

The frictional clutch plate 249 between the flange portion 245 and the worm wheel 239 is engaged by the drawing, whereby rotational force is transmitted from the worm wheel 239 to the rotating drive shaft 173 via the flange portion 245.

Consequently, by rotationally driving the worm gear 237 by virtue of the rotation of the motor, the rotating drive shaft 173 can be driven to rotate while being reduced largely in speed.

When the energization control of the electromagnet 238 is stopped, the worm wheel 239 is separated apart from the flange portion 245 by virtue of the return force of the plate 243, whereby the engagement of the frictional clutch plate 249 is released. Consequently, the rotating drive shaft 173 is allowed to rotate relative to the plate 243 of the worm wheel 239, whereby the rotating drive shaft 173 is then allowed to rotate freely.

Namely, with the flange portion 245 and the worm wheel 239 being connected to each other, when the worm gear 237 is driven to rotate by the motor, the worm wheel rotates at a largely reduced speed. The rotating drive shaft 173 is driven to rotate by the worm wheel 239 via the frictional clutch plate 249 and the flange portion 245. With the rotational speed being reduced between the gears 175, 169, the gear plate 165C is driven to rotate at a reduced speed by the rotating drive shaft 173.

The member 141 of the pressurizing member 137 is driven to rotate by this as has been described before, whereby a thrust is produced by the cam mechanism 145, thereby making it possible to control the engagement of the frictional multi-plate clutch 129. As this occurs, the engagement of the frictional multi-plate clutch 129 can be controlled in an ensured fashion using a small-sized motor by virtue of the speed reduction effected between the worm gear 237 and the worm wheel 239, as well as the speed reduction effected between the gears 175, 169.

When the engagement of the frictional multi-plate clutch 129 is released according to the running conditions of the automotive vehicle, it is not possible to release the engagement only by the return force of pressurizing member 137 with the control of the engagement of the motor 171 being stopped. In particular, with the worm gear 237 and the worm wheel 239 being used, while the engagement of the frictional multi-plate clutch 129 can be controlled in the ensured fashion using the small-sized motor, it is not possible to reverse the rotation of the worm wheel 239 by the return force of the pressurizing member 137, 137B.

In this embodiment, a detection signal representative of running conditions is inputted into the controller, and the controller interrupts the control of the energization of the electromagnet 238, whereby the rotating drive shaft 173 is made free to rotate relative to the worm wheel 239. The thrust produced by the pressurizing member 137 is released momentarily by the free rotation of the rotating drive shaft 173. The connection of the frictional multi-plate clutch 129 is released at once in conjunction with the release of the thrust. Consequently, the responsiveness of the frictional multi-plate clutch 129 to the release of engagement can be improved remarkable.

Thus, according to the embodiment, the frictional multi-plate clutch 129 can be brought into frictional engagement in the ensured fashion with the small-sized motor by allowing for the large speed reductions, the overall size and weight reduction can be attempted to be attained.

In addition, even with a construction in which the member of the pressurizing member 137 is driven to rotate by largely reducing the speed thereof by the rotational actuator 233, the responsiveness to the release of the engagement can be improved remarkably.

Since the electromagnetic clutch 235 is provided on the rotational actuator 233 so that the rotational driving of the rotating drive shaft 173 of the rotational actuator 233 is engaged or disengaged by the magnetic clutch 235, the rotational actuator 233 and the electromagnetic clutch 235 can be handled as a single unit, and the number of components can be reduced, the assembly and control of parts being thereby facilitated.

Note that the embodiment can equally be applied to the starter clutches 1, 1C, 1D, 1E, 1F.

In each embodiment, while the one member 139 of the pressurizing member 137, 137B is caused to engage with the fixed side, whereas the other member 141, 141B thereof is designed to be driven to rotate, both the members may be constructed to be driven individually by gears having gear ratios which are slightly different or gears whose meshing radii are slightly different so as to produce a relative rotation.

The frictional multi-plate clutch 129 functioning as the frictional engagement portion may be made up of others such as a cone clutch which is engaged by pressing force.

The torque transmission apparatus according to the invention is not limited to those constituting the starter clutches 1, 1C, 1D, 1E, 1F, 1G, and can be selected to be disposed appropriately like torque transmission couplings 1H, 1I, 1J, 1K, 1L, 1M, 1N shown in FIG. 1.

The torque transmission coupling 1H is interposed between the propeller shafts 33, so that the transmission of torque to the rear wheels 47, 49 can be attained by adjusting the engagement thereof. When the torque transmission coupling 1H is put in a torque transmission disengaging state, no rotation from the rear wheels 47, 49 is transmitted to an output shaft 29 on an upstream side of the torque transmission coupling 1H, whereby the energy loss at the time of two-wheel-drive can be suppressed.

The torque transmission coupling 1I is such as to be provided on the drive pinion shaft 39 on the rear differential 39 side, and the torque transmission from the propeller shaft 33 to the rear differential 39 can be attained through the adjustment of the engagement thereof. In this torque transmission coupling 1I, with the torque transmission coupling 1I being put in the torque transmission disengaging state, no rotation from the rear wheels 47, 49 is transmitted to the upstream side propeller shaft 33, whereby the energy loss at the time of two-wheel-drive can be suppressed.

The torque transmission coupling 1N is such as to be provided on the output shaft 29 of the transfer 21, and the torque transmission from the transfer 21 to the output shaft 29 can be attained through the adjustment of the engagement thereof. In this torque transmission coupling 1N, with the torque transmission coupling 1M being put in the torque transmission disengaging state, no rotation from the rear wheels 47, 49 is transmitted to the transfer 21, whereby the energy loss at the time of two-wheel-drive can be suppressed.

The torque transmission couplings 1J, 1K are such as to be interposed between the axle shafts, respectively, the torque transmission from the rear differential 39 to the left and right rear wheels 47, 49 can be attained through the adjustment of the engagement thereof. Either of the torque transmission couplings 1J, 1K may be provided. In the event that the torque transmission couplings 1J, 1K are interposed along the axle shafts 43, 45 as shown in the figure, when the torque transmission couplings 1J, 1K are put in the torque transmission disengaging state, no rotation from the rear wheels 47, 49 is transmitted to the rear differential 39 side, whereby the energy loss at the time of two-wheel-drive can be suppressed.

The torque transmission couplings 1L, 1M are such as to be interposed along the front wheels 15, 17 side axle shafts 11, 13. The function of the torque transmission couplings 1L, 1M is substantially similar to that of the torque transmission couplings 1J, 1K.

Further, in the above embodiment, the rotational actuator 177 or 233 comprises an electric motor or an electromagnetic roller. However, instead of the electric motor and the electromagnetic roller, a type using an operation rod, a type using a pull-wire, a type using electromagnetic solenoid, and fluid (hydraulic, pneumatic, and so on) actuator with a piston and a cylinder may be used as the rotational actuator.

Moreover, any mechanisms transformable a rotational movement into an axial movement, such as a mechanism with a pair of cam surfaces for generating a thrust power by relative movement of the cam surfaces in their axial direction, and a mechanism with male screw and female screw, may be used as the pressurizing member.

What is claimed is:

1. A torque transmission apparatus comprising:
   a casing;
   a first rotational member disposed in the casing;
   a second rotational member disposed relatively rotatable to the first rotational member;
   a frictional engagement portion provided between the first and second rotational members for transmitting torque according to an engaging force;
   a pressurizing member, including first and second members relatively rotatable to each other, that produces a thrust through relative rotation between the first and the second members for bringing the frictional engagement portion into friction engagement;
   an actuator supported on the casing for rotationally driving at least one of the first and second members to generate the relative rotation;
   a penetrating portion formed in the first rotational member and facing the pressurizing member; and
   a transmission member disposed in the penetrating portion and interposed between the pressurizing member and the second rotational member, for transferring a thrust of the pressurizing member to the second rotational member.

2. The torque transmission apparatus according to claim 1, wherein the pressurizing member is disposed on an inner radial side of the frictional engagement portion.

3. The torque transmission apparatus according to claim 1, further comprising: a driving member, connecting at one side to the actuator and at the other side to one of the first and second members of the pressurizing member, arranged to step over the first and second rotational members.

4. The torque transmission apparatus according to claim 1, wherein the actuator comprises an electric motor and is disposed on an outer radial side of the frictional engagement portion.

5. The torque transmission apparatus according to claim 4, wherein the actuator and the frictional engagement portion are offset in a rotational axis direction of the first and second rotational members.

6. The torque transmission apparatus according to claim 1, further comprising: a cancellation portion, for canceling or reducing the thrust between the first and the second members produced by a drag torque, provided at one of a first portion between the penetrating portion and the transmission member and a second portion in the pressurizing member.

7. The torque transmission apparatus according to claim 6, wherein the cancellation portion includes a cam surface.

8. The torque transmission apparatus according to claim 1, further comprising: a damper mechanism for damping an inertia force on the actuator side and a thrust produced by the inertia force applied to the pressurizing member.

9. The torque transmission apparatus according to claim 1, further comprising: a controller controlling the actuator, to drive the pressurizing member relatively fast when the actuator removes a play in a rotating direction of the pressurizing member, and to drive the pressurizing member relatively slow when the removal of the play is completed.

10. The torque transmission apparatus according to claim 1, further comprising: a controller controlling the actuator, according to a condition of an automobile, to hold the pressurizing member on standby at a neutral position where there exists a play and at a play removed position where there exist no or little play.

11. The torque transmission apparatus according to claim 1, further comprising: a positioning portion formed on the casing for positioning the pressurizing member in the rotating direction and enabling to assemble the pressurizing member, wherein the positioning portion maintains a neutral position of the pressurizing member.

12. The torque transmission apparatus according to claim 1, further comprising: a rotation coupling member disposed between the actuator and the pressurizing member; and a controller controlling the rotation coupling member, to be in a rotation engaging state for producing the thrust when the actuator rotates to drive the pressurizing member, and to be in a rotation disengaging state for releasing the thrust.

13. The torque transmission apparatus according to claim 12, wherein the rotation coupling member is disposed on the actuator, and the rotation coupling member engages or disengages a rotational driving of a rotating drive shaft of the actuator.

14. The torque transmission apparatus according to claim 1, further comprising: a boss portion formed on the first rotational member; and an oil pump supported on the casing, and engaged with the boss portion in an interlocking fashion.

15. The torque transmission apparatus according to claim 1 which is constructed as a starter clutch disposed on an output side of an engine or a torque transmission apparatus disposed in any one of an output side of transfer apparatus of a four-wheel-drive vehicle, an input side of rear differential, a propeller shaft between the transfer and the rear differential, front axle shafts and rear axle shafts.

16. A torque transmission apparatus comprising:

a casing;

a first rotational member disposed in the casing;

a second rotational member disposed relatively rotatable to the first rotational member;

a frictional engagement portion provided between the first and second rotational members for transmitting torque according to an engaging force;

a pressurizing member, including first and second members relatively rotatable to each other, that produces a thrust through relative rotation between the first and the second members for bringing the frictional engagement portion into friction engagement;

an actuator supported on the casing for rotationally driving at least one of the first and second members to generate the relative rotation;

an outer wall formed in the first rotational member in at least one of directions along an axis of rotation and extending towards an inner circumferential side of the first rotational member in a direction along a rotating radius;

a connecting wall formed in the second rotational member and extending along the outer wall;

an accommodating recessed portion formed in the outer wall to enter an inner circumferential side of the second rotational member, wherein the pressurizing member is disposed in the accommodating recessed portion;

a penetrating portion formed in the outer wall and facing to the pressurizing member; and a transmission member disposed in the penetrating portion and interposed between the pressurizing member and the connecting wall of the second rotational member, for transferring a thrust of the pressurizing member to the second rotational member.

17. The torque transmission apparatus according to claim 16, wherein the pressurizing member is disposed on the outer wall side of the connecting wall.

* * * * *